United States Patent [19]
Rhodes

[11] Patent Number: 6,003,754
[45] Date of Patent: Dec. 21, 1999

[54] AIRFOIL FOR A GAS TURBINE ENGINE AND METHOD OF MANUFACTURE

[75] Inventor: Jeffrey F. Rhodes, Zionsville, Ind.

[73] Assignee: Allison Advanced Development Co., Indianapolis, Ind.

[21] Appl. No.: 08/954,907

[22] Filed: Oct. 21, 1997

[51] Int. Cl.[6] .................... B23K 20/00; B23K 31/02; B23K 37/04
[52] U.S. Cl. .................... 228/106; 228/212; 228/5.5; 228/44.3
[58] Field of Search .................... 228/5.5, 44.3, 228/106, 126, 127, 193, 212

[56] References Cited

U.S. PATENT DOCUMENTS

| | | | |
|---|---|---|---|
| 2,952,902 | 9/1960 | Mora | 29/156.8 |
| 3,379,813 | 4/1968 | Austin . | |
| 3,707,750 | 1/1973 | Klass | 29/156.8 B |
| 3,810,711 | 5/1974 | Emmerson et al. . | |
| 3,904,101 | 9/1975 | Beltran et al. . | |
| 4,042,162 | 8/1977 | Meginnis et al. | 228/106 |
| 4,089,456 | 5/1978 | Toppen et al. | 228/195 |
| 4,152,816 | 5/1979 | Ewing et al. . | |
| 4,186,473 | 2/1980 | Cross et al. | 29/156.8 R |
| 4,220,276 | 9/1980 | Weisert et al. . | |
| 4,421,153 | 12/1983 | Wilkinson et al. | 164/35 |
| 4,434,835 | 3/1984 | Willgoose | 164/34 |
| 4,768,700 | 9/1988 | Chen . | |
| 4,811,778 | 3/1989 | Allen et al. . | |
| 5,072,871 | 12/1991 | Moracz et al. | 228/193 |
| 5,144,825 | 9/1992 | Burg et al. . | |
| 5,222,297 | 6/1993 | Graff et al. . | |
| 5,240,376 | 8/1993 | Velicki . | |
| 5,277,052 | 1/1994 | Braunheim et al. . | |
| 5,291,654 | 3/1994 | Judd et al. . | |
| 5,316,202 | 5/1994 | Murray et al. . | |
| 5,355,931 | 10/1994 | Donahue et al. . | |
| 5,421,853 | 6/1995 | Chen et al. . | |
| 5,462,627 | 10/1995 | Oldham et al. . | |
| 5,503,218 | 4/1996 | Campion et al. . | |
| 5,687,900 | 11/1997 | Zaccone et al. | 228/173.6 |

*Primary Examiner*—Patrick Ryan
*Assistant Examiner*—Kiley Stoner
*Attorney, Agent, or Firm*—Woodard, Emhardt, Naughton Moriarty & McNett

[57] ABSTRACT

A fabricated gas turbine engine component and method of manufacturing. In one embodiment the component having a structural member with a cover member metalurgically bonded thereto. The bonding of the cover member being controlled by an apparatus that sequentially applies a substantially non-unifrom bonding load across the components radius of curvature. The patterns utilized in the casting process are formed in one embodiment to a precision preformed geometry by a closed die forming operation.

59 Claims, 22 Drawing Sheets

AIRFOIL FOR A GAS TURBINE ENGINE AND METHOD OF MANUFACTURE

BACKGROUND OF THE INVENTION

The present invention relates generally to a gas turbine engine airfoil and a method of fabrication thereof. More particularly, the present invention has one embodiment wherein the airfoil includes a preformed cast cover member metalurgically bonded to an inner structural spar member. Although the invention was developed for gas turbine engines, certain applications may be outside of this field.

A gas turbine engine is typical of the type of turbo machinery in which the invention described herein may be advantageously employed. It is well known that a conventional gas turbine engine comprises a compressor for compressing air to an appropriate pressure necessary to support the combustion of a fuel in a combustion chamber. The high temperature exhaust gas exiting the combustion chamber provides the working fluid for a turbine, which powers the compressor. A power turbine driven by the flow of high temperature gas is utilized to turn a propeller, fan or other propulsion device. Further, the high temperature gas may be used directly as a thrust for providing motive power, such as in a turbine jet engine.

It is well known that the performance of gas turbine engines increases with the increase in the operating temperature of the high temperature gas flowing from the combustion chamber. A factor recognized by gas turbine engine designers as limiting the allowable temperature of the gaseous working fluid flowing from the combustion chamber is the capability of the various engine components to not degrade when exposed to the high temperature gas flow. Further, gas turbine engine designers are fully cognizant that the engine's airfoils are among the components exposed to the maximum thermal and kinetic loading during engine operation.

A variety of techniques have been integrated into the gas turbine engine blades and vanes to minimize their degradation as they are exposed to the high temperature gases. Film cooling, a standard technique generally integrated into blade and vane design, refers to a technique of cooling an external surface of the component by injecting a relatively cool media, such as air along the component's external surface. The cooling media functions as an insulating layer to reduce the unwanted heating of the external surface of the component by the flow of high temperature gas.

A second conventional technique often incorporated into the component design is an internal network of apertures and passageways within the component. A steady flow of pressurized cooling media is passed through the internal passageways of the component, and the cooling media is finally exhausted through the apertures onto the exterior surface of the component. The passage of the cooling media through the internal passageways and out through the exit apertures provides for convective heat transfer from the component walls to the cooling media.

Many prior gas turbine engine airfoils, such as vanes and blades, have been produced by production techniques using labor intensive complicated casting methods or laminating procedures. The typical lamination process utilized to produce an airfoil involves the high temperature diffusion or braze bonding of multiple layers of wrought material together to form the airfoil. Casting a sophisticated airfoil has required a generally elaborate procedure often with a relatively low yield that tended to be very labor intensive.

Although the prior techniques have produced airfoil components with internal passageways, exit apertures and film cooling, the need remains for an improved method and apparatus for making a fabricated gas turbine engine airfoil with a cover sheet metalurgically bonded to a spar. The present invention satisfies this need in a novel and unobvious way.

SUMMARY OF THE INVENTION

One form of the present invention contemplates an apparatus for bonding a cover member to a spar member of an airfoil for gas turbine engine. The apparatus contemplates a mechanical housing enclosing the cover member and the spar member during bonding, the spar member fixedly positioned relative to said mechanical housing; and a plurality of clamping members along substantially the entire outer surface of said cover member for holding said cover member and said spar member in substantially form fitting engagement during said metallurgical bonding, said plurality of clamping members sequentially adjusted to apply a non-uniform clamping load to said outer surface, whereby upon heating metallurgical bonding can occur between said spar member and said cover member.

A second form of the present invention contemplates a method for fabricating a gas turbine engine airfoil by metallurgically bonding a cover member to a spar member that is performed within a mechanical housing having a plurality of clamping members coupled thereto. The method comprising: placing the spar member and cover member within the mechanical housing so that they are disposed in substantially form fitting alignment; engaging the outer surface of the cover member with the plurality of clamping members; applying a non-uniform clamping load through the plurality of clamping members to the outer surface of the cover member; and, heating the spar and cover member so that metallurgical bonding can occur therebetween.

A third form of the present invention contemplates an apparatus for bonding a gas turbine engine airfoil cover member to a gas turbine engine airfoil spar member. The apparatus, comprising: a mechanical housing enclosing the cover member and the spar member during metallurgical bonding; and, a plurality of deformable pressurizable bladders disposed within the mechanical housing for holding the cover member in substantially form fitting engagement with the spar member during the metallurgical bonding, at least one of the plurality of deformable pressurizable bladders being sequentially deformable between a first end and an opposite second end to sequence the transmission of an initial bonding load over the cover member, whereby upon heating metallurgical bonding can occur between the spar member and the cover member.

A fourth form of the present invention contemplates a pattern for forming a void in a casting mold that upon the receipt and solidification of molten metal therein results in the formation of a a plurality of pedestals in a cast gas turbine engine component. The pattern, comprising: a non-reusable main body member having a first surface and an opposite second surface; a plurality of spaced recesses formed in the first surface for receiving a flowable mold forming material therein that defines a portion of the mold for the plurality of pedestals; and, a plurality of reliefs formed in the second surface for facilitating the formability of the body member, at least one of the plurality of reliefs being disposed between an adjacent pair of spaced recesses in the first surface.

Another form of the present invention contemplates an apparatus for forming an airfoil cover member pattern. The apparatus, comprising: a mandrel having an outer surface with a contour corresponding to a precision airfoil spar member, the outer surface adapted for receiving a first surface of the cover member pattern thereagainst; a locating member coupled to the mandrel for locating the pattern on the mandrel; and, a ceramic member having a surface corresponding to a precision airfoil external contour, the surface adapted for receiving a second surface of the cover member pattern thereagainst, whereby the mandrel and the ceramic member cooperating to form the cover member in a predetermined shape.

One object of the present invention is to provide an improved method of manufacture for a gas turbine engine airfoil.

Related objects and advantages of the present invention will be apparent from the following description.

DESCRIPTION OF THE PREFERRED EMBODIMENT

Figure 1:
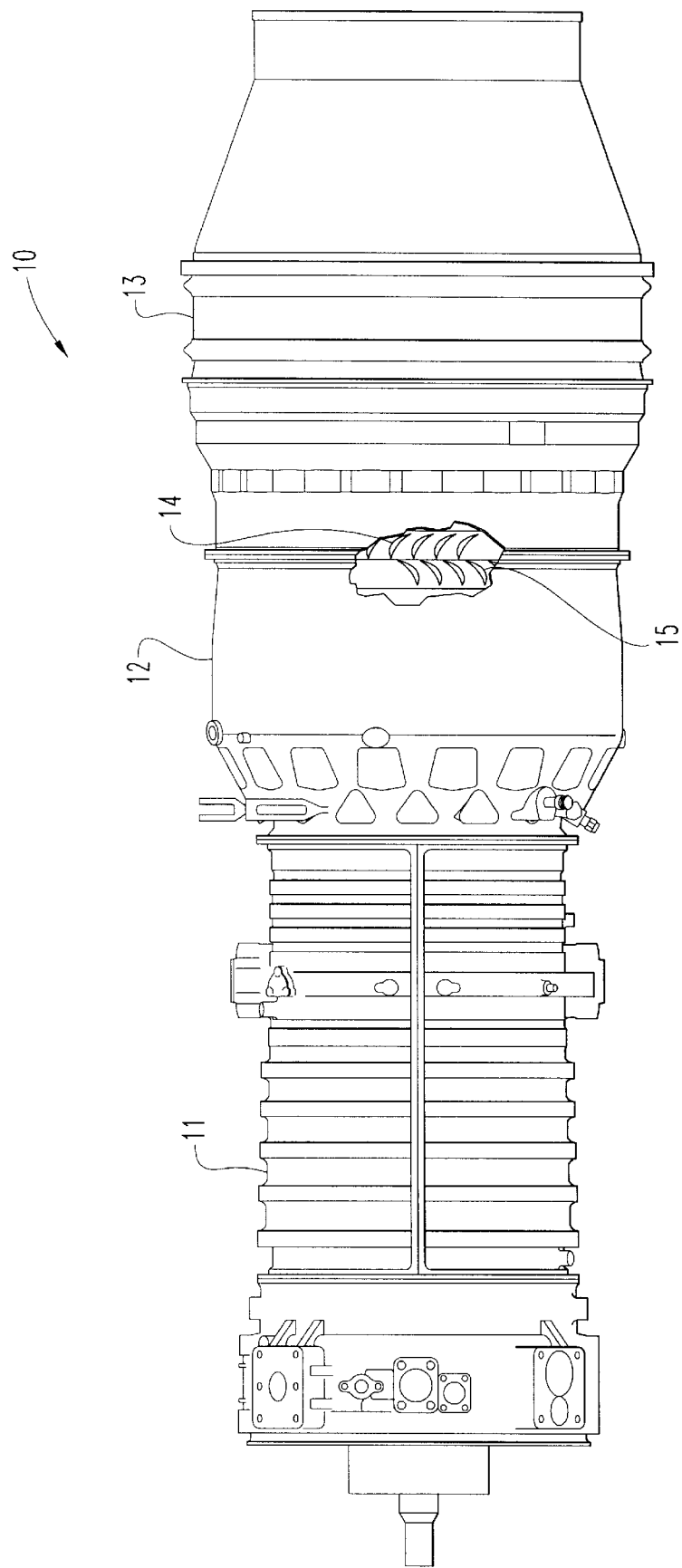
FIG. 1 is a partially fragmented perspective view of a gas turbine engine including one airfoil embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a gas turbine engine 10 which includes a compressor 11, a combustor 12 and a power turbine 13. The three components have been integrated together to produce an aircraft flight propulsion engine. The term aircraft is generic and includes helicopters, airplanes, missiles, unmanned space devices and other substantially similar devices. It is important to realize that there are a multitude of ways in which the gas turbine engine components can be linked together. Additional compressors and turbines could be added with intercoolers connecting between the compressors and reheat combustion chambers could be added between the turbines. Further, the gas turbine engine is equally suited to be used for an industrial application. Historically, there has been widespread application of industrial gas turbine engines, such as pumping sets for gas and oil transmission lines, electricity generation and naval propulsion.

A plurality of turbine blades 14 are coupled to a rotor disk that is affixed to a tubular shaft within the gas turbine engine 10. A plurality of vanes 15 are conventionally joined together to collectively form a complete 360° nozzle. It is understood herein that gas turbine engine blades and vanes are often referred to as airfoils, and hereinafter this application will refer to blades and/or vanes as airfoils, unless specifically stated otherwise in the text.

In a preferred embodiment the gas turbine engine airfoils 14 and 15 are fabricated from multiple subcomponents, and preferably the subcomponents are formed of a heat resistant super alloy composition. There are various types of super alloy compositions, such as but not limited to nickel based or cobalt based compositions, and the manufacturers of such compositions are generally known to those skilled in the art. Most super alloy compositions of interest are complicated mixtures of nickel, chromium, aluminum and other select elements. The subcomponents may be of a wrought or cast configuration and may have an equiaxed, directionally solidified, or a single crystal alloy structures. In a preferred embodiment the gas turbine airfoils 14 and 15 are fabricated from components of a cast single crystal alloy structure.

Figure 2:
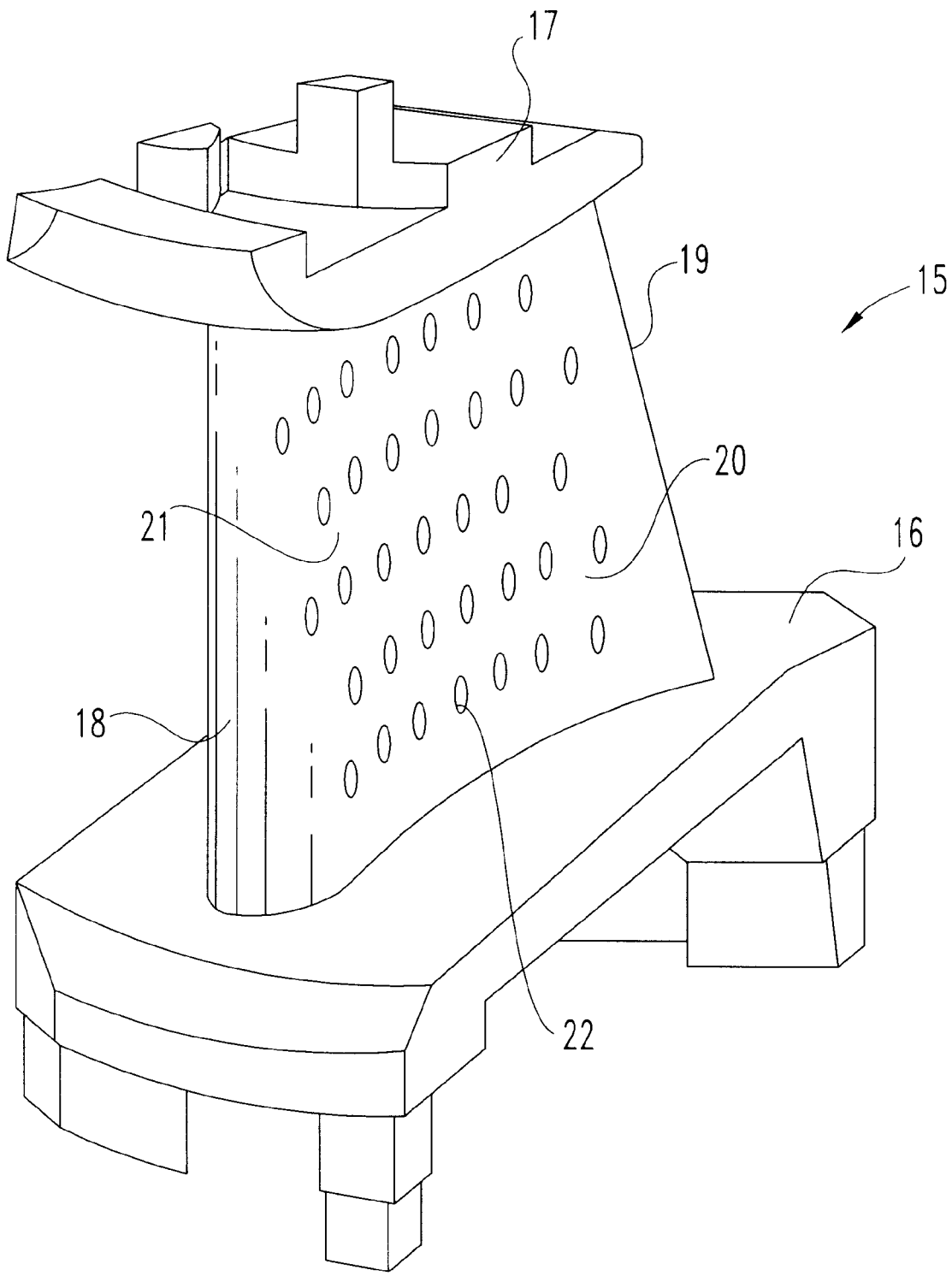
FIG. 2 is a perspective view of an airfoil of FIG. 1.

With reference to FIG. 2, there is illustrated a perspective view of one embodiment of the gas turbine engine airfoil 15. In one embodiment, airfoil 15 includes a first end wall member 16, and an opposite other second end wall member 17. The airfoil 15 has a leading edge 18 and a trailing edge 19 and an outer surface 20 extending therebetween. Hereinafter, the term spanwise will indicate on orientation between the first end wall 16 and the second end wall 17, and the term streamwise will indicate an orientation between the leading edge 18 and the trailing edge 19. A concave pressure side 21 and an opposite convex suction side (not illustrated) comprise portions of the outer surface 20. Arranged along the outer surface 20 of the airfoil 15 are a plurality of cooling media exit apertures 22 that allow for the discharge of cooling media across the outer surface. The illustration of cooling media apertures in FIG. 2, is merely illustrative and is not intended to be limiting in any fashion. The location and quantity of cooling media exit apertures are generally driven by the design parameters of a specific application. In another embodiment of the present invention the fabricated airfoil does not have endwall members coupled thereto.

Figure 3:
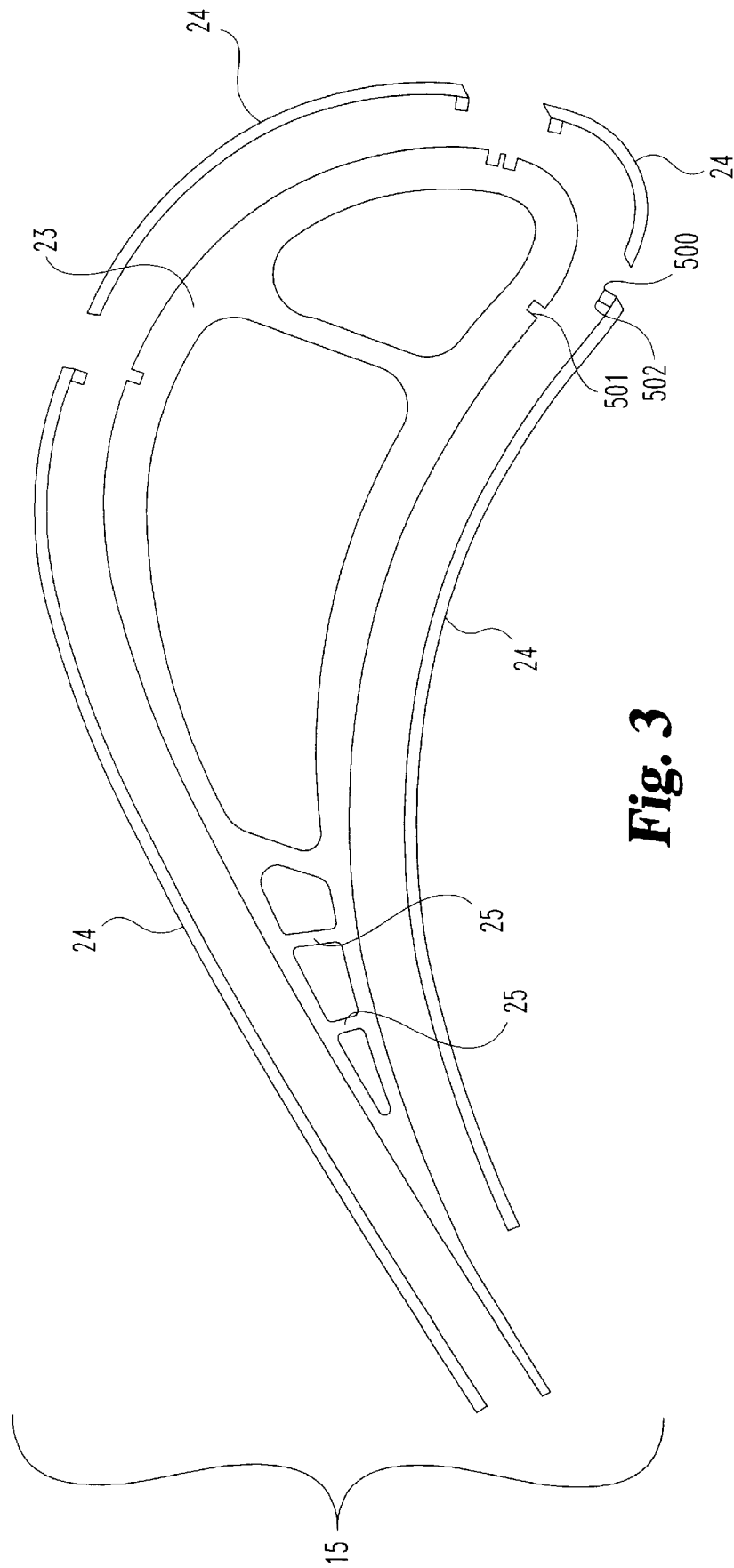
FIG. 3 is an exploded view of an airfoil of the present invention comprising a cover member and a spar member.
Figure 3A:
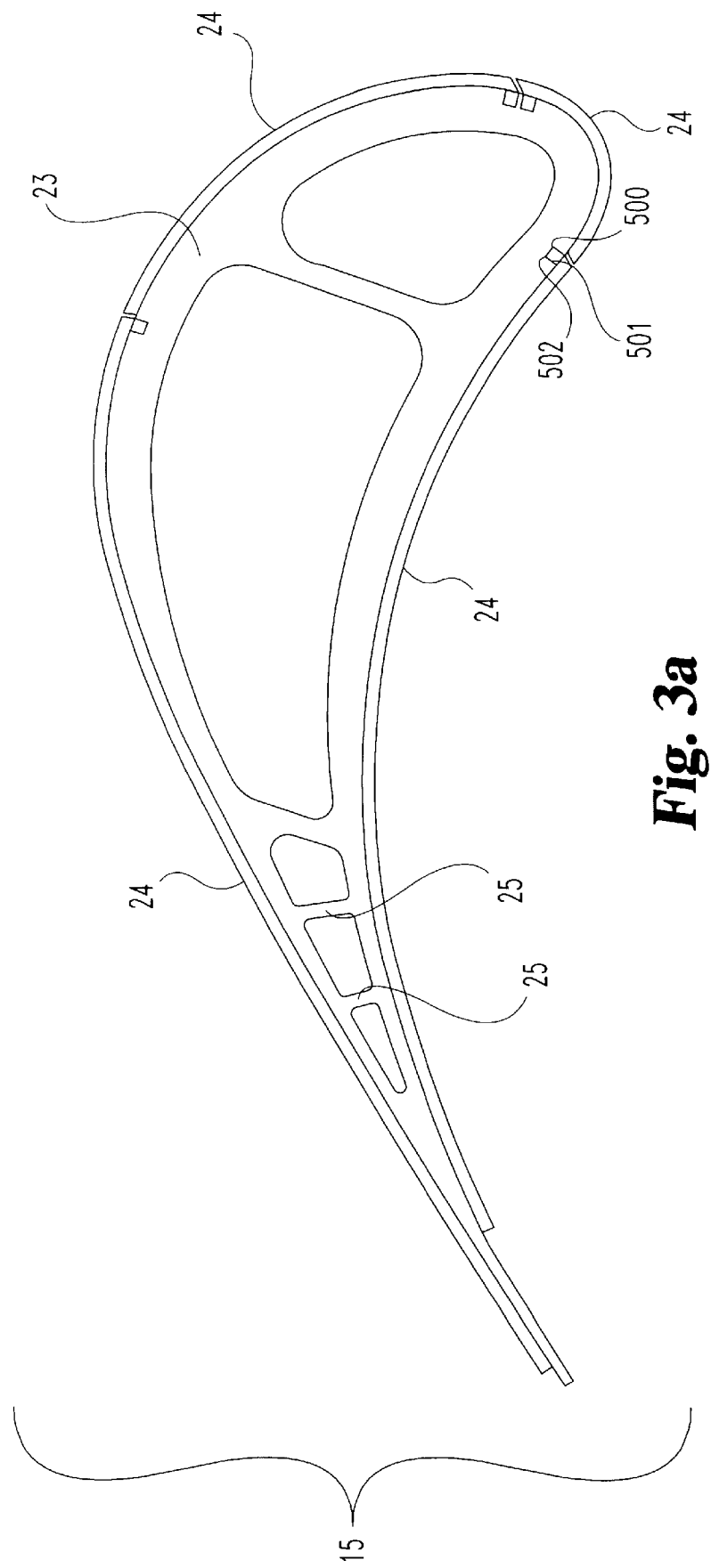
FIG. 3a is an assembled view of the airfoil of FIG. 3.

With reference to FIG. 3, there is illustrated an exploded sectional view of the fabricated airfoil 15 prior to the metallurgical bonding of a plurality of preformed cover members 24 to a preformed structural spar member 23. The preformed cover members preferably being shaped to substantially correspond to the outer surface of the spar member 23. In one embodiment the cover members 24 are cast to a near net shape. The fabricated airfoil in one embodiment has at least three cover members 24. Airfoils having a number of cover members in the range of one to ten are contemplated herein, more preferred is airfoils having the number of cover members in the range of one to two. In one embodiment (FIG. 3a), the preformed cover members 24 are spaced streamwise one from one another so as to leave a slot 750 between adjacent members 24. The slot 750 allowing the exit of cooling fluid therethrough onto the outer surface of the airfoil. Cover members 24 having properties to withstand a hostile environment which subjects the airfoil to thermal loading and oxidation.

In one embodiment each of the cover members 24 and the spar member 23 are of a cast configuration. However, cover members and spar members of a wrought configuration are contemplated herein. Further, there are alternate embodiments wherein one of the spar member and cover member is wrought, and the other of the spar member and cover member is cast. Cover members having a thickness within a range of 0.015 inches to 0.025 inches are preferred, and it is more preferred that the cover members 24 have a thickness of about 0.020 inches. While it is preferred that each of the cover members 24 and the spar member 23 are formed of similar materials, there are alternate embodiments where the spar member and cover members are formed of different materials; for example the spar member material may be selected for strength characteristics while the cover member material may be selected for resistance to oxidation and has a lower coefficient of expansion than the spar member material. Further, in one embodiment airfoil 15 has a plurality of cooling media passageways (not illustrated in FIG. 3) formed in at least one of the spar and cover members such that upon the mating of the components a cooling media passageway will form therebetween.

Spar member 23 has a precise outer airfoil contour for receiving the plurality of cover members 24 thereagainst. The spar member 23 having substantial structure to withstand the operating loads for the airfoil and to withstand the pressures necessary during the manufacturing process for bonding the components together. Anti-collapse members 25 are designed into the spar member 23 to assist thinner sections of the structure from collapsing during the bonding process. In an alternate embodiment the spar member 23 does not include anti-collapse members 25.

In one embodiment the cover members 24 and the spar member 23 have a locating feature 500, which includes an aperture 501 and a pin 502, that is designed and constructed to locate the components for joining. Each of the cover members 24 preferably has only one pair of locating features 500, so as to initially locate the respective components while allowing some movement of the cover members 24 during the bonding process. With reference to FIG. 3c, there is illustrated an illustrative view of one embodiment of the locating feature 500. The pins 502 extending from the cover member 24 for location in the spar member 23. The aperture 501 (hidden line) is formed in the spar member 23 for receiving one of the pins 502, and a groove 601 is formed in the spar member 23 for receiving the other pin 502. The groove 601 being larger than the corresponding pin 502 to allow for adjustment in tolerances.

Figure 3B:
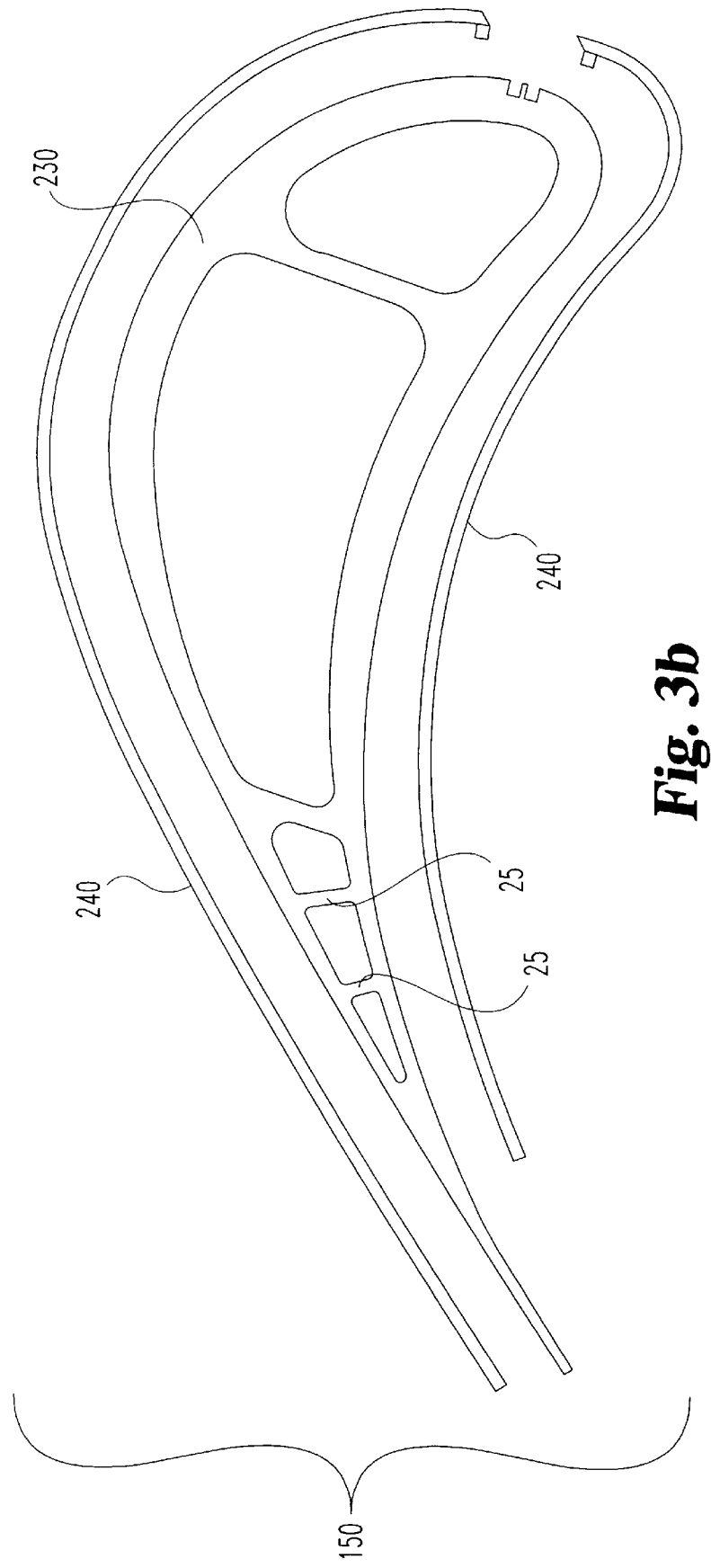
FIG. 3b is an exploded view of an alternative embodiment of an airfoil of the present invention comprising a cover member and a spar member.
Figure 3C:
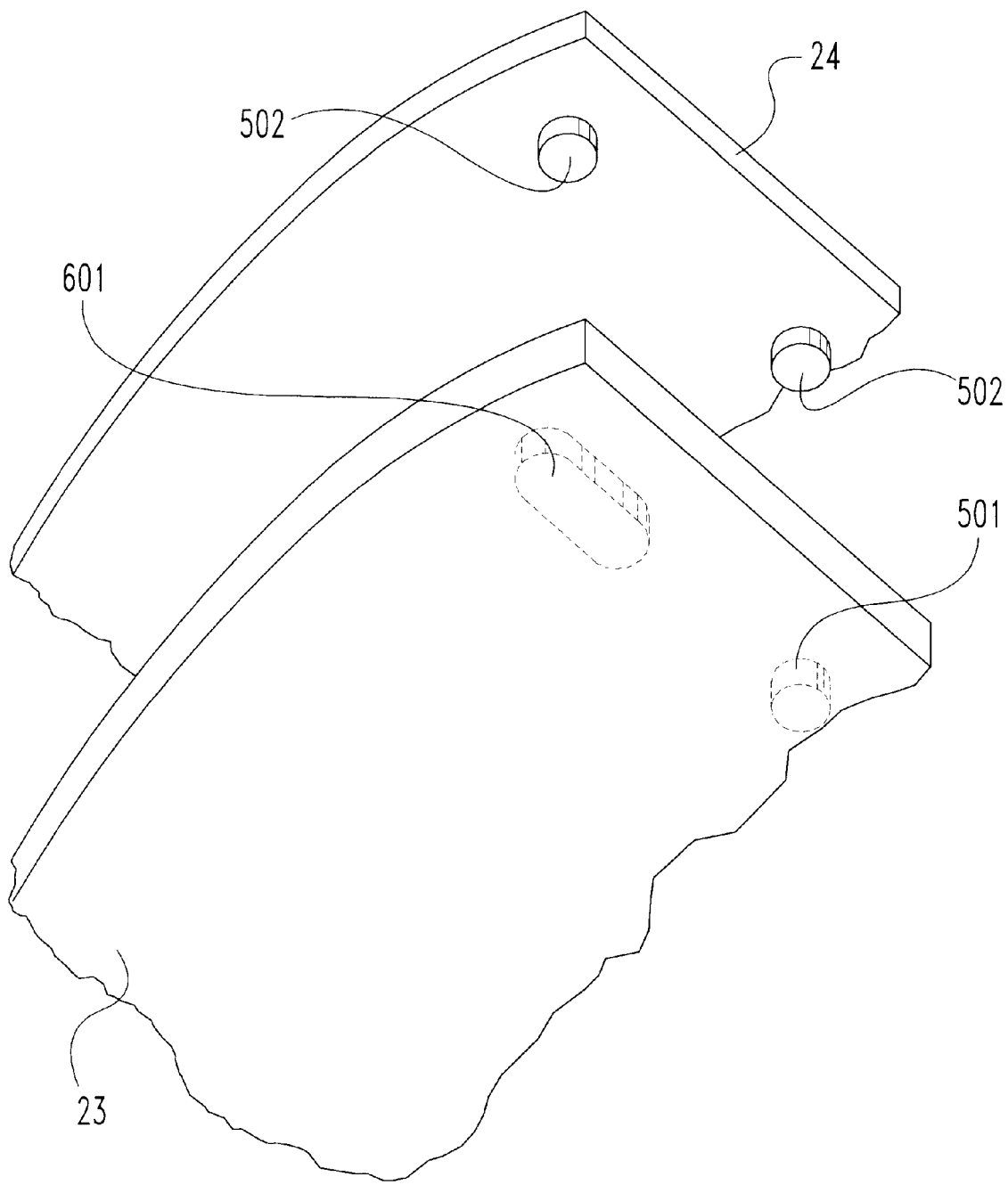
FIG. 3c is an illustrative view of a locating feature comprising a portion of one embodiment of the airfoil of the present invention.

Referring to FIG. 3b, there is illustrated an exploded view of another form of the fabricated airfoil 150 prior to the joining of the preformed cover members 240 to the preformed structural spar member 23. The fabricated airfoil 150 is substantially identical to the fabricated airfoil 15 with the following exceptions. The fabricated airfoil 150 has two preformed cover members 240 that are spaced apart at the suction side of the leading edge of the airfoil.

Figure 4:
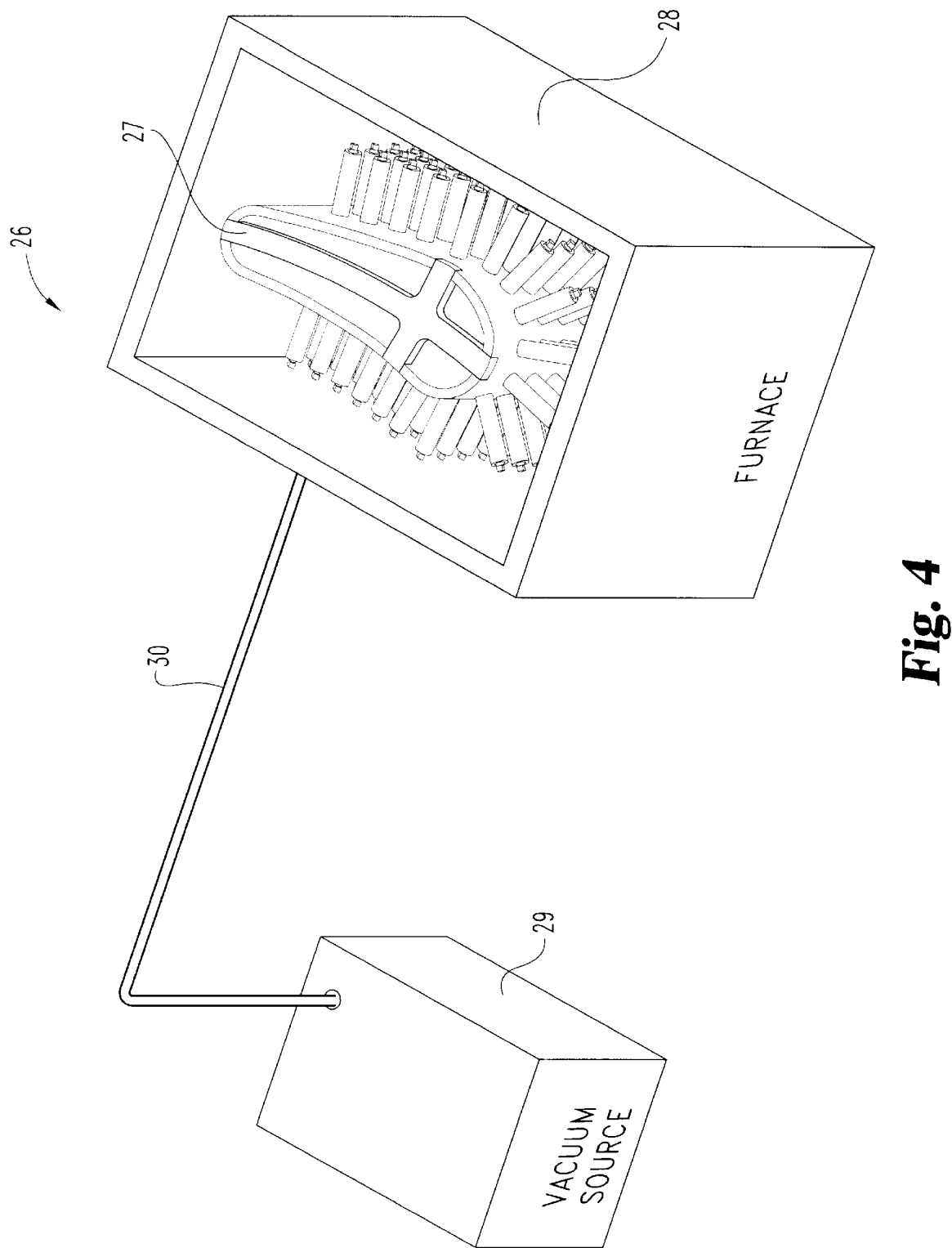
FIG. 4 is an illustrative view of one embodiment of an apparatus for producing the airfoil having a cover member bonded to a spar member which comprises a portion of FIG. 1.

Referring to FIG. 4, there is illustrated a perspective view of one embodiment of an apparatus 26 for bonding the plurality of cover members 24 to the spar member 23. A bonding tool 27 is positioned within a conventional vacuum brazing furnace 28, which has sufficient capacity to raise the spar member 23 and the airfoil cover members 24 to temperatures necessary to effectuate a metallurgical bond therebetween which includes, but is not limited to a high temperature diffusion bond braze. In U.S. Pat. No. 5,609, 471, incorporated herein by reference, there is described a diffusion braze bond utilizing a hyper-eutectic composition of nickel, chromium and boron. The term metallurgical bonding as used herein refers to the joining of the surfaces of similar or dissimilar metals by applying heat and pressure for a time duration sufficient to cause compiling of the atoms at the joint interface. Diffusion bond brazing is well known by people of ordinary skill in the art, who will recognize that a joining at the atomic level occurs which includes a grain growth across the interface of the two components being bonded. The metallurgical bonding of the cover members 24 to the spar member 23 requires the heating to a uniformly high bonding temperature in the range of 2100–2220 degrees fahrenheit and the application of a compressive load to the outer surface of the components being bonded. In a more preferred form of the present invention, the bonding temperature is about 2150 degrees fahrenheit. Further, the bonding cycle time is in the range of about 1–5 hours. It is understood herein that other bonding temperatures and times are contemplated, and will depend on many parameters associated with the airfoil design.

The apparatus of FIG. 4, only illustrates one bonding tool 27 disposed within the vacuum furnace 28, however in an alternate embodiment there are a plurality of bonding tools 27 positioned within the vacuum furnace. Vacuum source 29 having sufficient capacity to lower the pressure and actively evacuate the environment within and/or around the bonding tool 27 during the bonding cycle. The pressure within the evacuating environment is preferably within a range of $1 \times 10^{-4}$ to $5 \times 10^{-5}$ Torr and more preferably is about $5 \times 10^{-5}$ Torr. However, other pressure ranges are contemplated herein.

Figure 5:
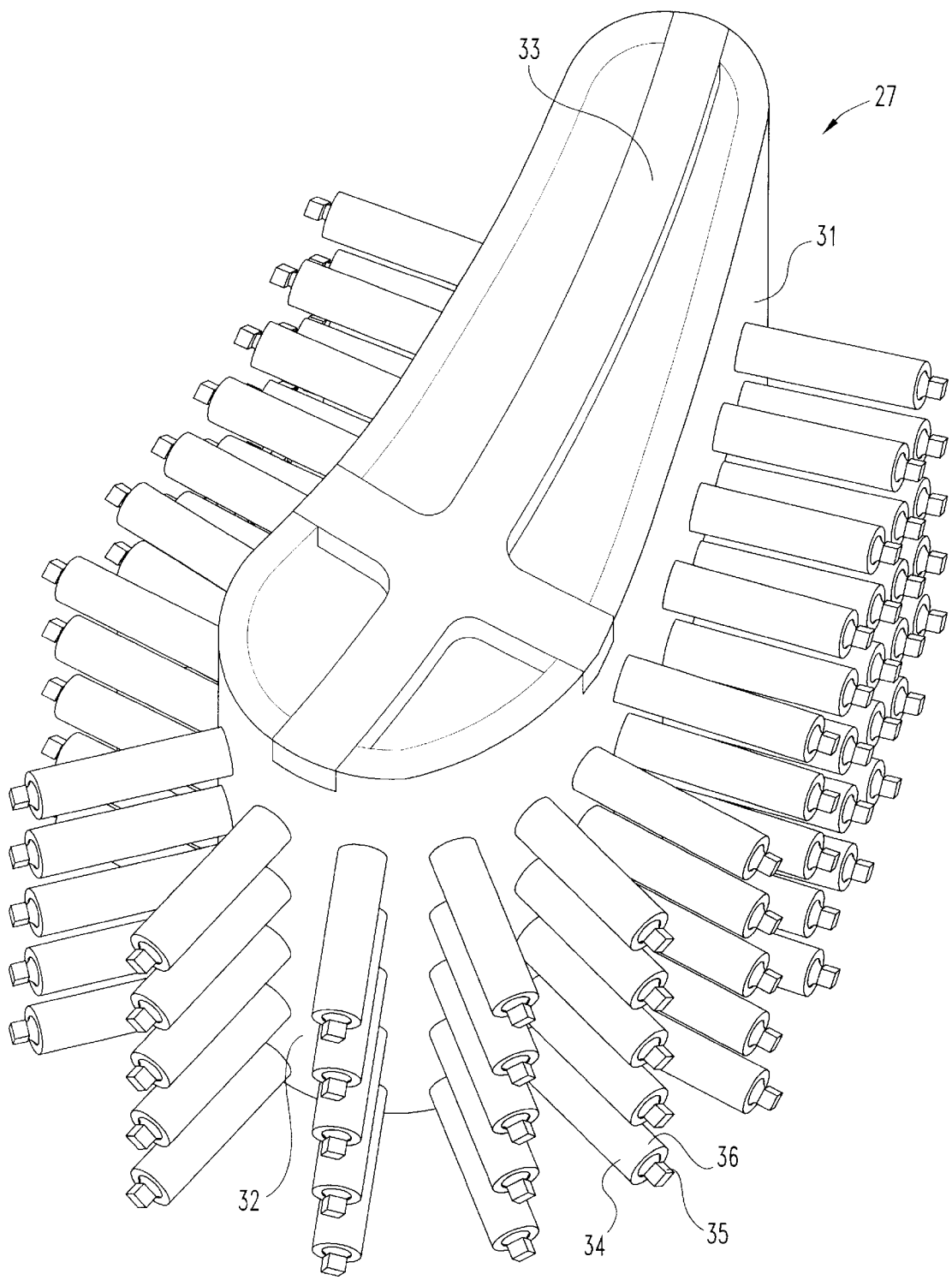
FIG. 5 is a perspective view of a bonding tool comprising a portion of the FIG. 4 apparatus.

With reference to FIG. 5, there is illustrated a perspective view of the reusable bonding tool 27 removed from the furnace 28. The bonding tool 27 includes a mechanical housing 31 having a lower positioning member (not illustrated), a sidewall 32 and a removable top positioning member 33 for receiving and fixturing the spar member 23 and the cover member 24 during the joining operation. In one embodiment the spar member 23 is fixedly positioned by the top positioning member 33 and the lower positioning member (not illustrated) relative to the mechanical housing 31 during the joining process. The mechanical housing 31 defines a reusable structure capable of withstanding repeated cycles in a high temperature diffusion bond brazing or diffusion bonding operation, and in one embodiment is formed of a cast nickel based superalloy. It is preferred that the coefficient of expansion of the mechanical housing 31 be substantially similar to the coefficient of expansion of the spar member 23 and the cover member 24.

A plurality of clamping load transfer assemblies 34 are coupled to the mechanical housing 32. The structure of the clamping load transfer assemblies 34 will be discussed below, along with their relationship with the spar member 23 and the cover members 24. A load transfer assembly outer main body member 36 is fixedly connected to the mechanical housing 32, and the outer main body member 36 receives an adjustment means 35 therein. The plurality of load transfer assemblies 34 are disposed along the entire outer surface of the cover members 24 in order to hold the cover members 24 and spar member 23 in substantially form fitting engagement during the bonding process. In one embodiment of the present invention there are 90 clamping load transfer assemblies 34 coupled to the mechanical housing 31. In another form of the present invention there are clamping load transfer assemblies 34 in the range of about 25–50, and more preferably there are 45 clamping load transfer assemblies 34. It is understood herein that other quantities of clamping load transfer assemblies are contemplated, however it is preferred that the quantity of clamping load transfer assemblies be a multiple of 3 or 5.

The clamping load transfer assemblies 34 of the FIG. 5, bonding tool 27 are independently adjustable by varying the adjustment means 35. Further, in an alternate embodiment the adjustment of the clamping load transfer assemblies 34 is controlled by an automatic process. The adjustment of the clamping load transfer assemblies 34 can be accomplished by: a torque wrench; a pneumatic torque wrench; and/or a fixture containing a plurality of wrenches for engaging and adjusting the individual adjustment means 35.

Figure 6:
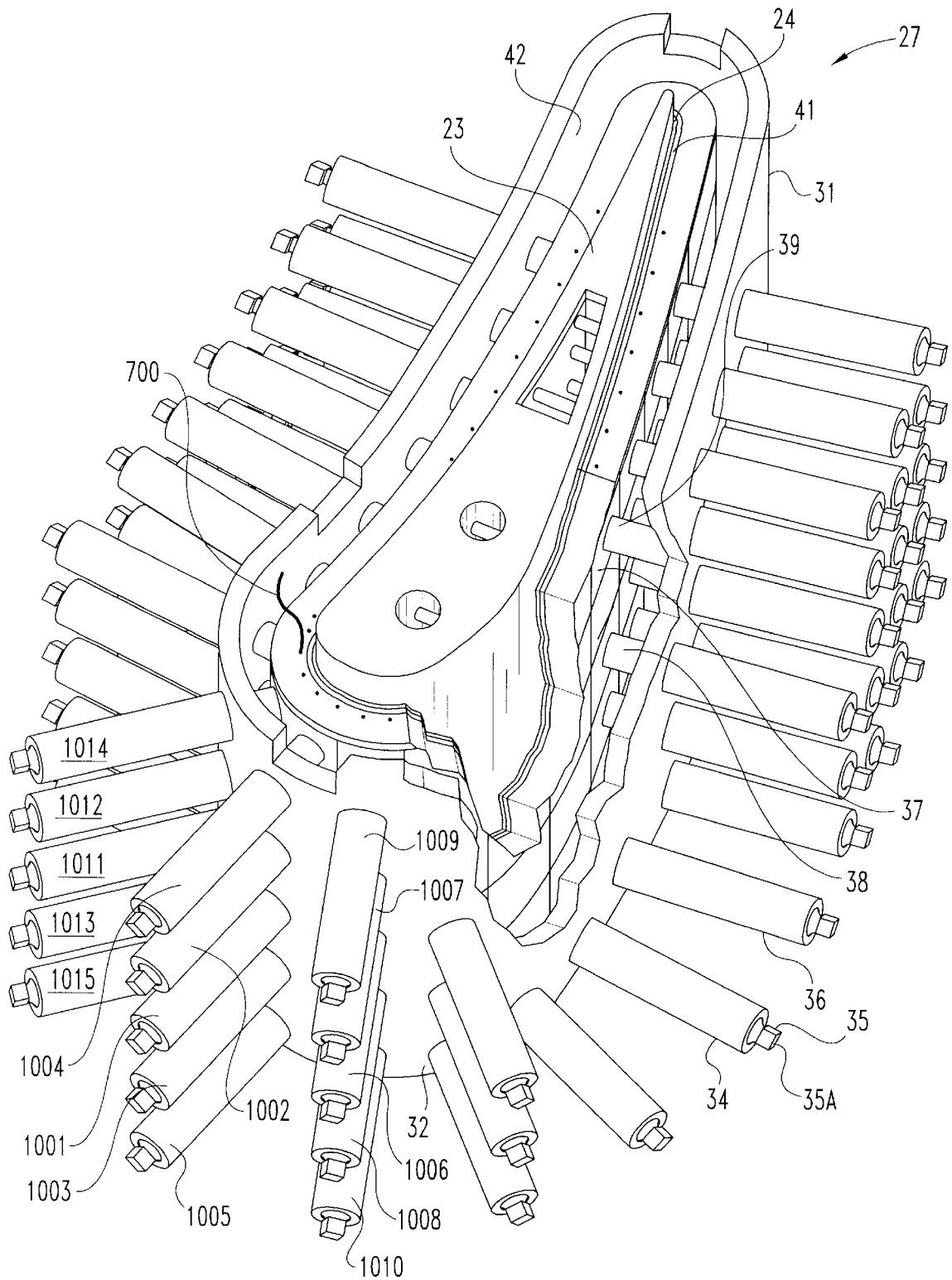
FIG. 6 is a partially fragmented view of the bonding tool of FIG. 5 with the top positioning member removed.

With reference to FIG. 6, there is illustrated a fragmented perspective view of the bonding tool 27 (top positioning member 33 being removed for clarity) having the spar member 23 and cover members 24 positioned therein. The interengaging assembly of the spar member 23 and the cover members 24 is fixedly positioned within the mechanical housing 31 so as to be spaced from an inner surface 42 of the mechanical housing sidewalls 32. Each of the clamping load transfer assemblies 34 include: the outer main body member 36 that is fixedly connected to the mechanical housing 31; a clamping load pad 37 disposed proximate the cover member 24; and, a load transfer member 38 coupled to the clamping load pad 37 at a first end 39 and acted on by the adjustment means 35 at a second end 39a. In one form of the present invention a non-reusable compliant interface member 41 is positioned between the outer surface of the cover members 24 and the clamping load pad 37. The compliant interface member 41 providing additional formability and an anti-diffusion layer. Examples of the types of compliant interface material include ceramic felt, and mild steel. A more preferred form of the compliant interface 41 is a mild steel woven screen having a standard stop-off coating thereon.

The plurality of clamping load transfer assemblies 34 are spaced along the mechanical housing 31 so as to orient the clamping pads 37 in substantially form fitting engagement with the non-reusable compliant interface member 41, and/or the cover member 24. The clamping load is preferably applied normal to the outer surface of the cover members 24 through the centroid of the respective clamping load pads 37. To facilitate this form fitting engagement between the components the clamping load pads 37 have a radius of curvature that corresponds to the nominal (i.e. design) curvature of the outer surface of the cover member 24 that is positioned proximate the bearing location of the head 37. Therefore, the clamping load pad 37 is brought into substantially form fitting relationship with the cover member 24. Further, the plurality of clamping load pads 37 are positioned so that the substantially entire outer surface of the cover members 24 receives a bonding load from one of the respective clamping load transfer assemblies 34. In a preferred form of the present invention the bonding load is applied sequentially. The regions of higher curvature generally require, relative to the regions of lesser curvature, a greater load applied to their surfaces to bring the cover member 24 into intimate contact with spar member 23. Therefore, in one form of the present invention the clamping load transfer assemblies 34 are sequentially adjusted so as to apply a non-uniform bonding load to the surface of the cover members 24. A member 700 passes through the clamping pads 37 so as to join them loosely into an assembly for easier handling. In the preferred form of the present invention the member 700 is a high strength molybdenum wire.

Figure 7:
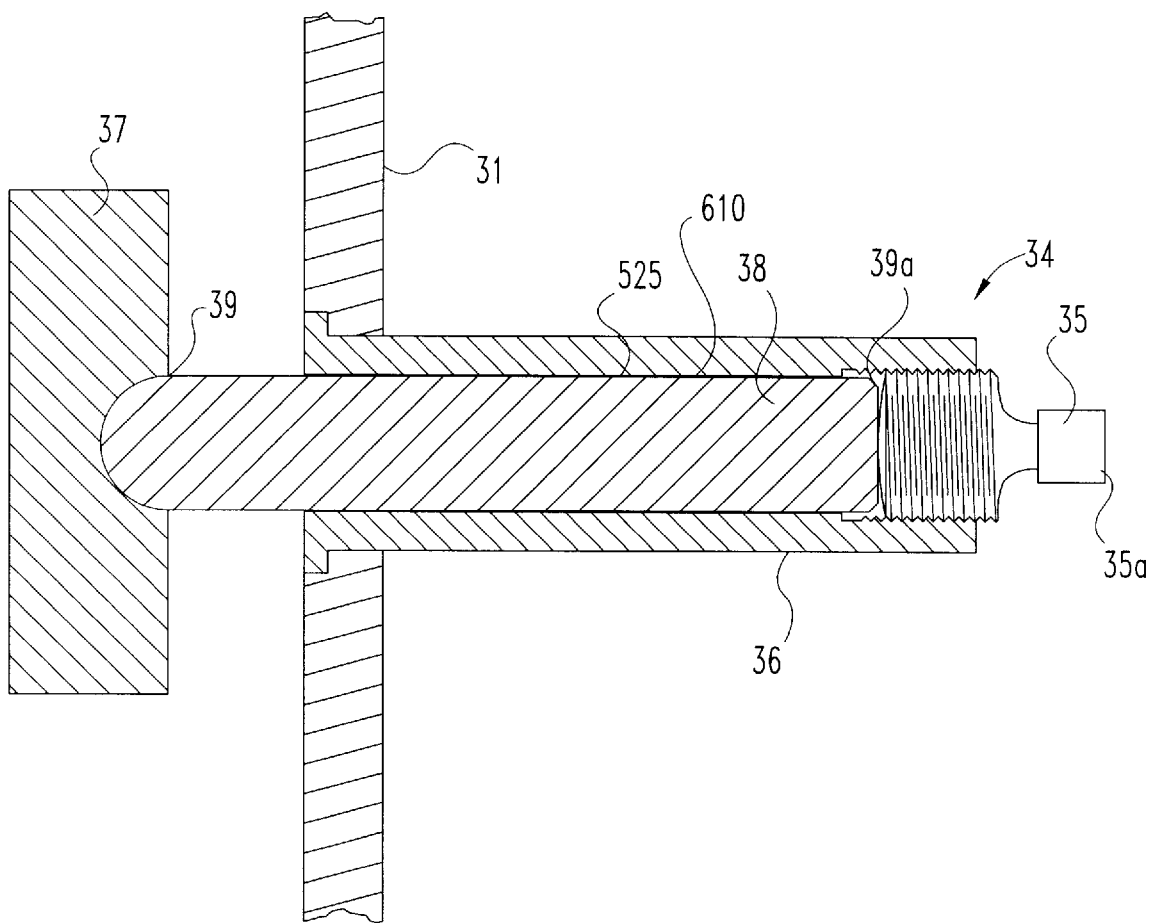
FIG. 7 is an enlarged sectional view of the load transfer assembly comprising a portion of the FIG. 5 bonding tool.

With reference to FIG. 7, there is illustrated a sectional view of one of the clamping load transfer assemblies 34. The clamping load transfer assembly 34 has a load transfer member 38 that is disposed within a central aperture 525 of the main body member 36. The surfaces of the central aperture 525 and the load transfer member 38 are in a close sliding relationship so as to allow movement of the member 38 in an axial direction, thereby varying the bonding load transmitted from the clamping load pads 37 to the cover members 24. A minimum gap must be maintained between the member 38 and the wall 610 defining the central aperture to allow for the difference in thermal expansion and an allowance for a stop-off coating. The preload of the clamping load pad 37 is accomplished through the adjustment means 35, and in a preferred embodiment the adjustment means 35 is a threaded member that is advanced by turning the head 35a. A non threaded portion of the head 35a extends into the central aperture for engaging the load transfer member 38.

In one embodiment of the present invention the load transfer member 38 defines a cylindrical rod having a thermal coefficient of expansion greater than the thermal coefficient of expansion of the main body member 36. Upon the bonding tool 27 being placed in the furnace 28 and subjected to elevated temperatures the thermal conditions cause the load transfer member 38 to elongate relative to main body member 36. The elongation of load transfer member 38 results in the first end 39 displacing the clamping load pads 37 against the cover members 24. The opposite other end 39a of the load transfer member 38 remains in contact with adjustment means 35 within the central aperture. In one embodiment of the present invention, the main body member 36 is formed of a material such as, but not limited to, silicon nitride or TZM Moly, and the load transfer member 38 is formed of a nickel based directionally solidified superalloy. While the degree of thermal elongation of the load transfer member 38 is designed to meet specific manufacturing parameters, it is preferred that the elongation of the load transfer member 38 is in the range of about 0.005 inches to 0.015 inches. In a more preferred embodiment the thermal elongation of the load transfer member 38 is about 0.010 inches.

Figure 8:
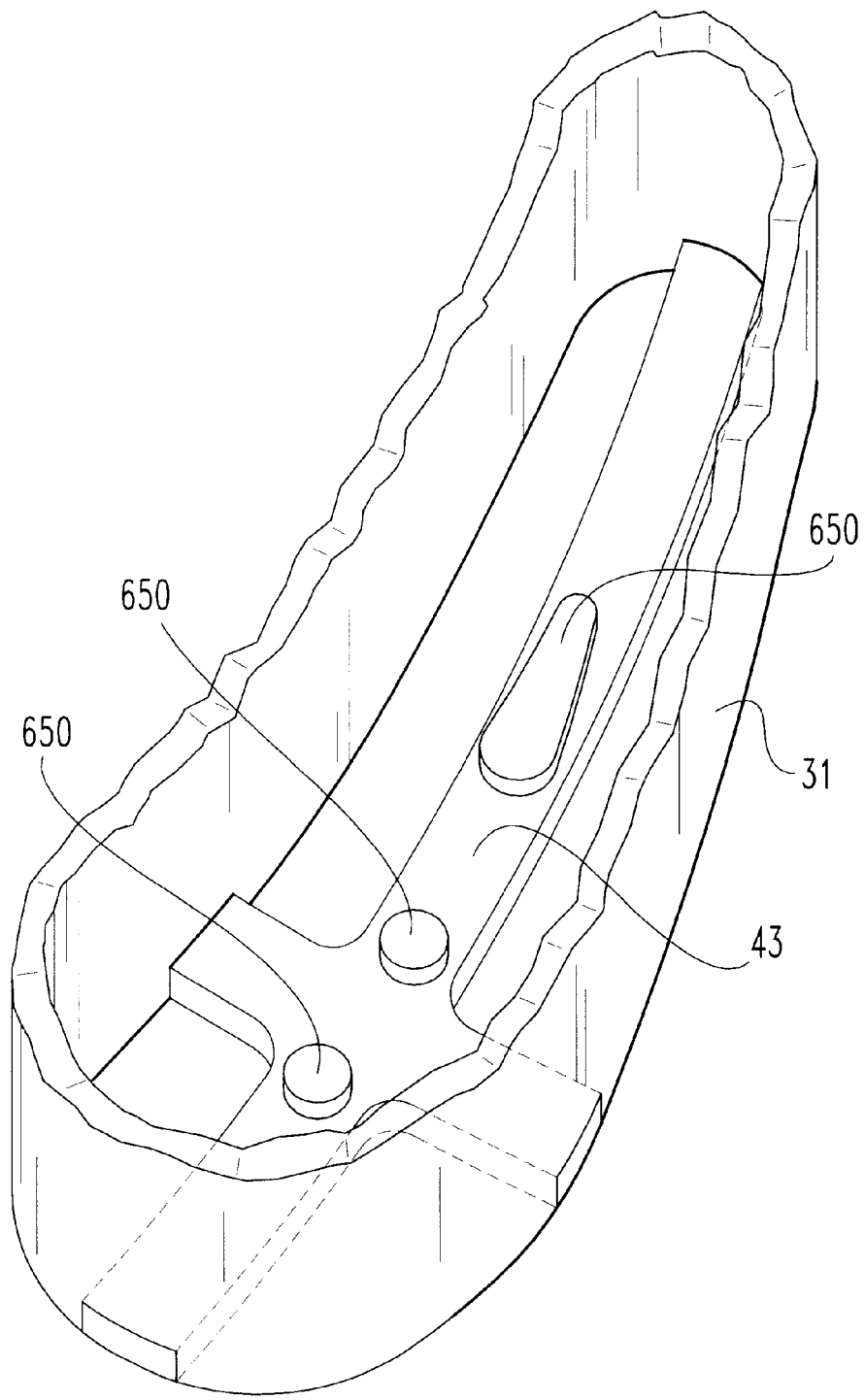
FIG. 8 is an illustrative fragmented view of a spar locating member for positioning the spar member within the mechanical housing of the bonding tool of FIG. 5.

Referring to FIG. 8, there is illustrated a fragmented illustrative view of the mechanical housing 31 having a spar member locating fixture 43 positioned therein. The spar member locating fixture 43 having a plurality of engagement means 650 for mating with the spar member 23. A similar spar member locating fixture is defined by the removable top positioning member 33. The spar member locating fixture 43 and removable top positioning member 33 are designed and fabricated to position, hold, and support the spar member 23 within the mechanical housing during the bonding process. By holding the spar member 23 in place relative to the mechanical housing it is possible to transfer unbalanced loading, resulting from the non-uniform loads applied from the clamping load transfer assemblies 34, to the mechanical housing 31 through the spar member locating fixture 43 and the removable top positioning member 33. In a preferred embodiment the spar member locating fixture 43 is defined by a cross key structure, however it is not intended to limit the structure utilized to hold the spar member 23 within the mechanical housing 31.

Figure 9:
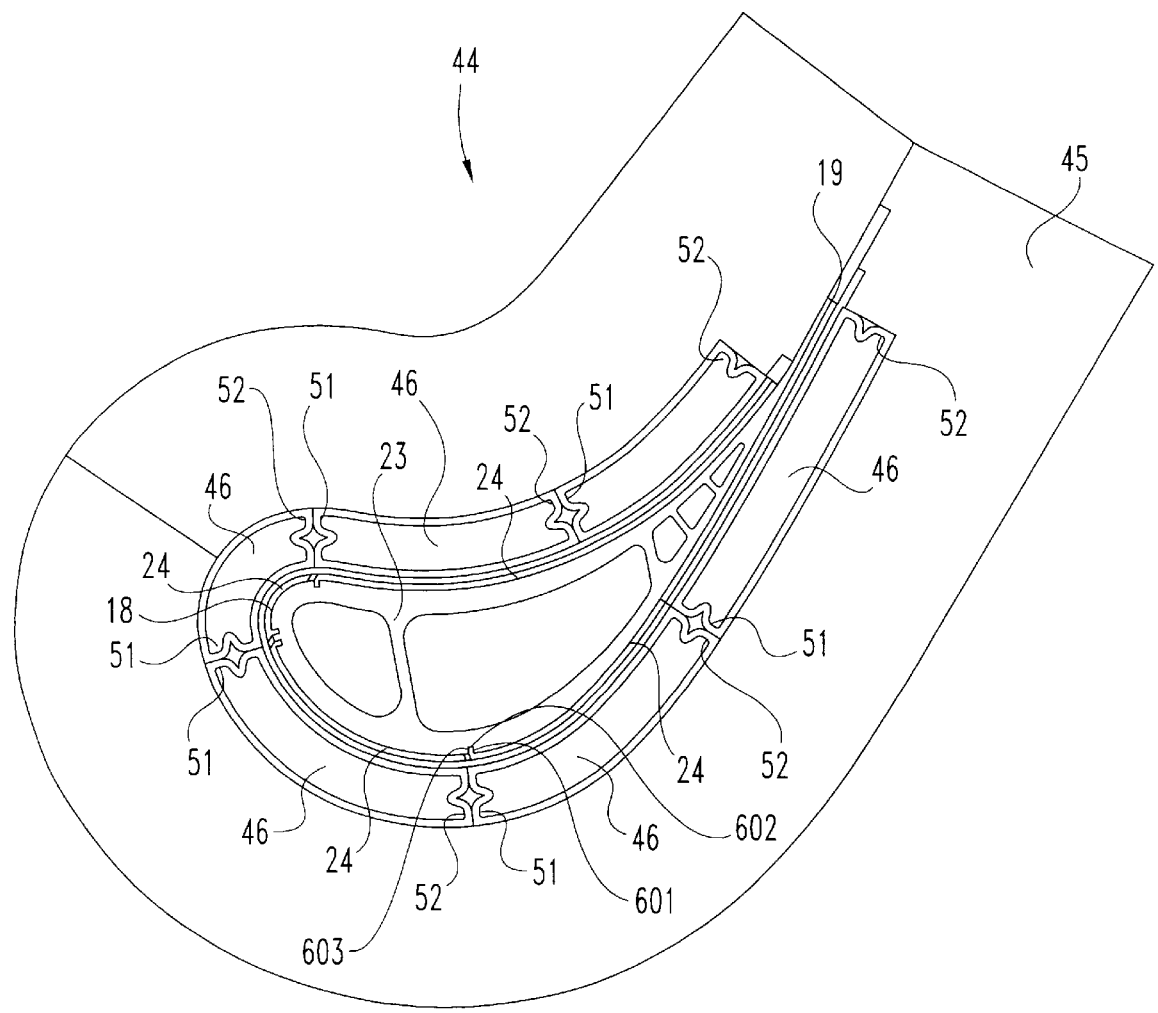
FIG. 9 is an illustrative view of an alternative embodiment of the apparatus for producing an airfoil comprising a portion of the FIG. 1 gas turbine engine.
Figure 10:
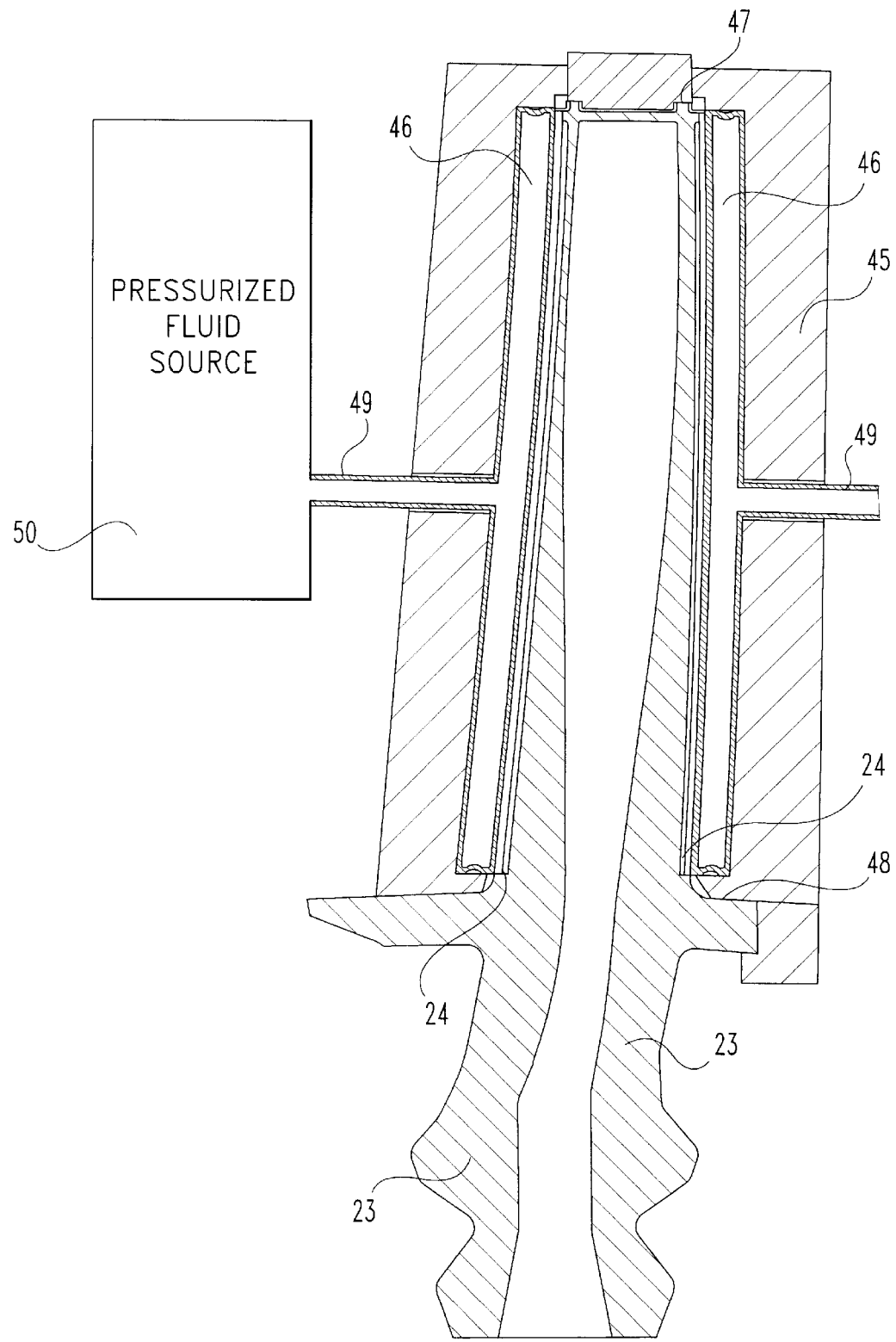
FIG. 10 is an illustrative sectional view of the bonding tool of FIG. 9 positioned around the cover member and spar member.

With reference to FIGS. 9 and 10, there is illustrated an alternative embodiment of a bonding tool 44 utilized in the bonding of a plurality of cover members 24 to a spar member 23. The reusable bonding tool 44 being positionable within the furnace 28 in an analogous fashion to that previously described for bonding tool 27. Bonding tool 44 is designed and constructed to be utilized in a furnace as illustrated in FIG. 4, to effectuate a metallurgical bond between the cover members 24 and the spar member 23.

The bonding tool 44 comprises a reusable clamshell type mechanical housing 45 having a plurality of load applying members 46 positioned therein for applying the desired bonding load to the cover member(s) 24 and spar member 23. In one form of the present invention, mechanical housing 45 defines a rigid die having a substantially long manufacturing life. In a preferred form of the present invention the housing 45 is formed of a nickel based superalloy. The combination of the plurality of cover members 24 and the spar member 23 are located within the mechanical housing 45. The spar member 23 being engaged by the mechanical housing 45 at the spar member's tip 47 and at the spar member's hub 48. The engagement at the tip 47 and the hub 48 positions the spar member 23 in a fixed location during the bonding operation, and any motion between the components during the bonding cycle results from the displacement of the cover members 24 by the load applying members 46. Further, locating features 601 orient the cover members 24 with the spar member 23. The locating feature 601 is substantially similar to the locating feature 500 of the airfoil 15. Locating feature 601 includes a pair of locating pins 603 that mate with the spar member 23. A first aperture 602 is formed in the spar member for receiving one of the pins 603, and a groove 604 (not illustrated) is formed in the spar member 23 for receiving the other pin 603. The groove 604 being larger than the corresponding pin 602 to allow for adjustment in assembly tolerances.

The plurality of reusable load applying members 46 are defined in one embodiment of the present invention by reusable deformable bladders that are pressurizable with a high pressure fluid. The pressurized fluid being delivered from a pressurized fluid source 50 via a plurality of pressurized fluid passageways 49 to the load applying members 46. In one embodiment, the fluid is an insert gas such as Argon, that is delivered at a pressure ranging between about 50–500 pounds per square inch gage.

Each of the plurality of deformable bladders 46 having a first end 51 and an opposite second end 52. The first end 51 will be referred to hereinafter as the leading edge end 51, and the second end 52 will be referred to hereinafter as the trailing edge end 52. The deformable bladders 46 are designed and constructed to deform beginning at their locating feature 601 (preferably located at their respective leading edge end 51) and continue their individual deformation sequentially to the trailing edge end 52 so as to avoid leaving gaps in the application of the bonding load to the cover member 24. The incremental deforming of the bladders 46 in one embodiment is accomplished by varying the bladder wall thickness over the spanwise direction. The bladders 46 being formed of cast or wrought material such as, but not limited to, IN625, HASTALY X, HA230 or other materials having similar properties and designed to have a useful life of about 500 bonding cycles.

At the temperatures utilized for bonding the cover members 24 to the spar member 23 the deformable bladders 46 have a substantially compliant phase that conforms in a substantially form fitting relationship to the cover member 24. In one form of the present invention the compliant phase is defined by a substantially elastic state. A pressurized fluid is delivered to each of the load applying members 46 to transmit the bonding load necessary to metallurgically bond the cover member 24 to the spar member 23. While the bonding tool 44 has been illustrated with six discrete load applying members 46 it is understood herein that the number and division of the load applying members can be varied to meet the specific parameters of the design.

To facilitate the desired bonding of the cover member 24 to the spar member 23 the plurality of bladders 46 are pressurized sequentially from the leading edge 18 to the trailing edge 19 of the spar member. The sequential pressurizing of the cover members 24 minimizes and/or prevents the trapping of an unbonded portion between the leading edge 18 and the trailing edge 19. Further, as previously discussed the individual bladders 46 deform from their respective locating features 601, preferably located at their individual leading edge end 51, to their individual trailing edge end 52. The spar member 23 of FIG. 9, will be used by way of example to illustrate the relationship between the relative curvature of the spar member 23 and the fluid pressure in the deformable bladders 46 proximate the specific radius of curvature. Generally, the deformable bladders 46 that are disposed proximate the higher radius of curvature are pressurized to a higher level than the deformable bladders 46 that are disposed proximate a smaller radius of curvature. Further, in an alternate embodiment a compliant interface is positioned between the bladders 46 and the cover members 24.

Figure 11:
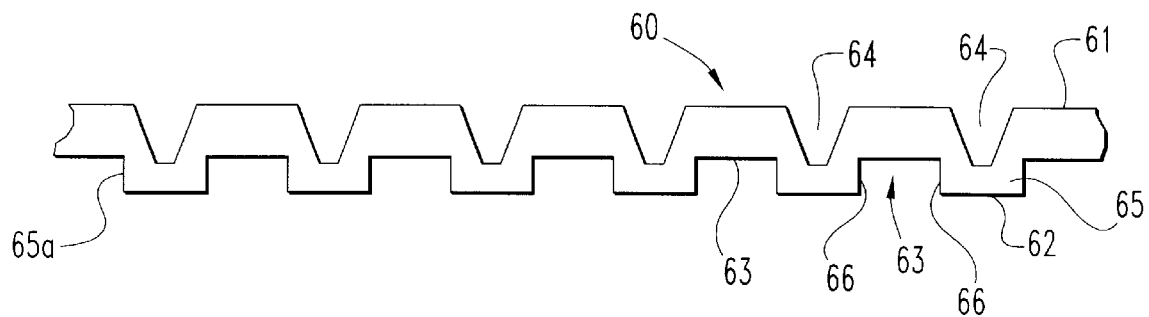
FIG. 11 is a side elevational view of one embodiment of an airfoil cover member pattern of the present invention.

With reference to FIG. 11, there is illustrated a partial side elevational view of an airfoil cover member pattern 60. In the preferred embodiment the pattern 60 is a disposable component for forming a void in the casting mold utilized to cast gas turbine engine components. Cover member pattern 60 having a first surface 61 and an oppositely disposed second surface 62 with a plurality of spaced recesses 63 formed therein. The spaced recesses 63 having a generally rectangular shape for receiving a flowable core/mold forming material therein during a casting mold preparation step. The spaced recesses 63 having a size appropriate for defining a passageway within the final cast component. A plurality of pattern wall members 65 are formed in the cover member pattern 60 and a spaced pair of them define the walls 66 of the recesses 63. Walls 66 may include a draft angle as deemed necessary for the removal of the pattern 60 from the pattern mold. During the manufacturing/casting process the cover member pattern 60 will be shelled with a ceramic system and the pattern 60 will be subsequently removed so that a plurality of pedestals can be cast into the space previously occupied by the pattern wall members 65. The dimensional size and geometric features shown in FIG. 11, are not intended herein to be limiting and it is understood that the pedestal size and spacing will be determined by the desired operational parameters associated with the gas turbine engine.

Figure 12:
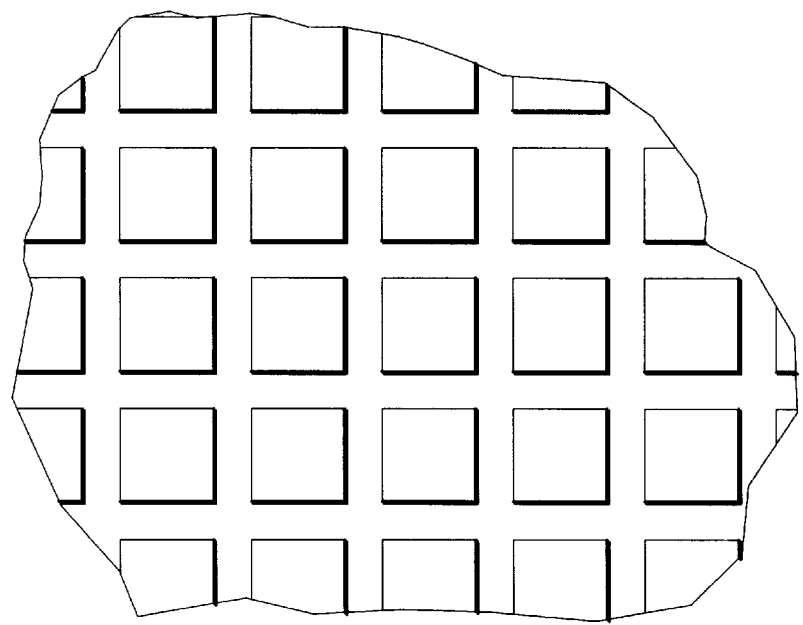
FIG. 12 is a schematic representation of one embodiment of a pedestal configuration for an airfoil.

With reference to FIG. 12, there is illustrated a diagrammatic representation of a cooling pedestal pattern. It is understood herein that the shape, size and distribution of the cooling pedestals are a function of heat transfer parameters and design specific parameters. The diagram is utilized herein merely to represent that pedestals having the following dimensions are more particularly contemplated, and one embodiment of the channels and pedestals are set forth in table 1. However, it is understood that other pedestal and channel sizes are contemplated herein.

TABLE 1

| | PEDESTAL | |
|---|---|---|
| Length | Width | Height |
| 0.020–.050" | 0.020–.050" | 0.012–.020" |
| | CHANNEL | |
| N/A | 0.012–.020" | 0.012–.020" |

The first surface 61 of pattern 60 has a plurality of spaced reliefs 64 formed therein for facilitating the flexation of the cover member pattern 60 during the forming of the pattern into the desired shape. The reliefs 64 being located opposite of the wall member 65 to facilitate the localized bending of the pattern in this region. In one embodiment the reliefs 64 having a truncated V-shape that extends into the body of the pattern. More particularly, in one embodiment the reliefs 64 extend about ⅔ of the thickness of the pattern 60. One function of the reliefs 64 is to facilitate the formation of the pattern 60 over a forming structure while minimizing/eliminating the faceting that often occurs in forming a pattern without the back side relief provided by reliefs 64.

The plurality of spaced reliefs 64 formed in the pattern 60 create a litany of advantages, including, but not limited to, the following: a reduction in the shrinkage of the wall member 65; defining a space for receiving excess adhesive that is used to bond the pattern 60 to another member; providing a place during the burning out of the pattern for the material being burned out to go; and improving formability. Selection of a material for the cover member pattern 60 is within the contemplation of persons of ordinary skill in the art and can depend upon its application. However, the cover member pattern 60 is a non-reusable component that is removed from the casting mold prior to the pouring of molten metal therein. Materials contemplated for the cover member pattern 60 include: Ethylene-vinyl acetate (EVA), with or without wax; and polystyrene. However, it is understood that other materials having similar properties are contemplated herein.

In one embodiment the material for forming the cover member pattern 60 is injected into a conventional flat die which has been evacuated prior to the injection so that substantially no air or contaminants are trapped in the volume that ultimately defines the pattern 60. Subsequent to the injection of the material into the flat die to form the cover member pattern 60, the pattern 60 will be removed and formed into the desired shape, such as an airfoil.

Figure 13:
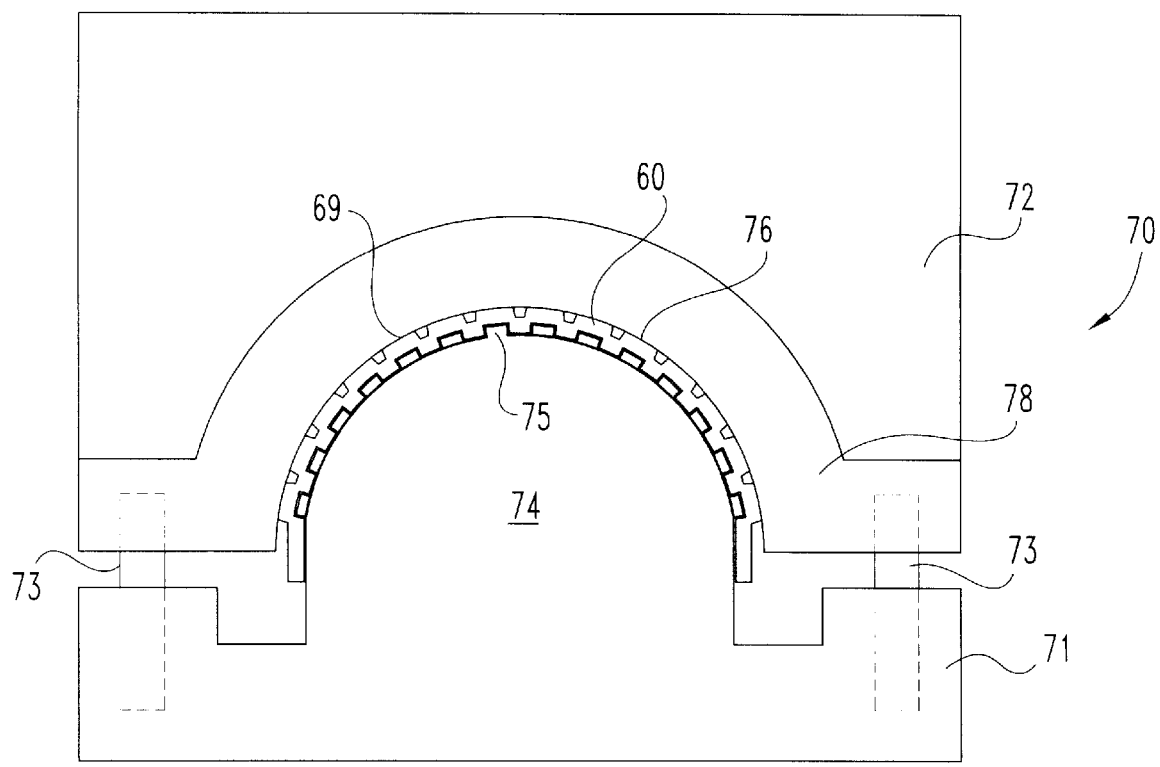
FIG. 13 is an illustrative view of an apparatus for forming the airfoil cover member pattern of FIG. 11 into a shape corresponding to the surface of the airfoil span.
Figure 14:
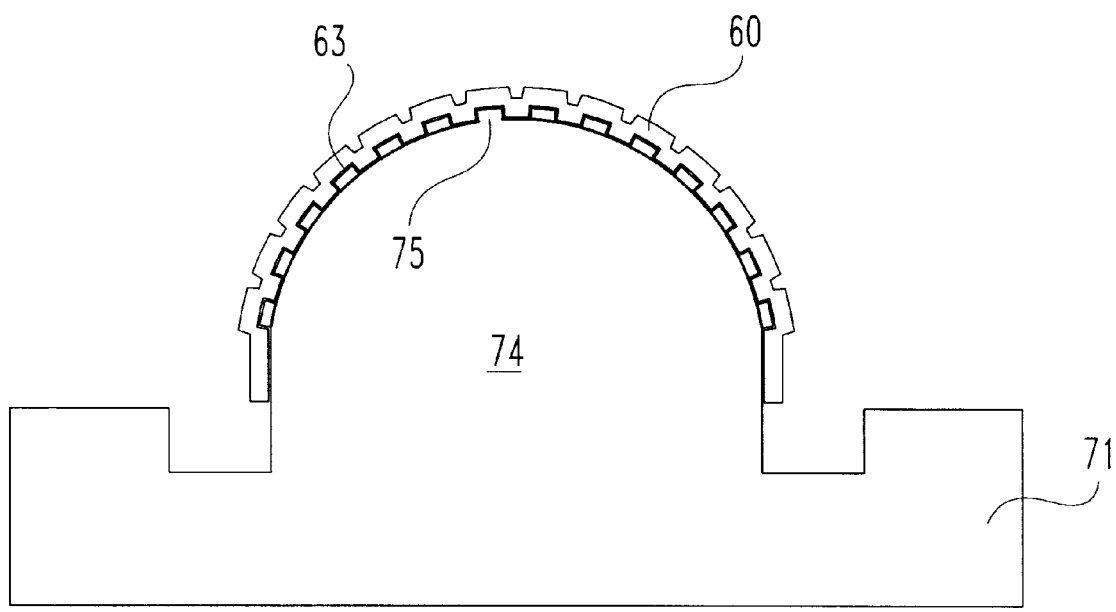
FIG. 14 is an illustrative view of the FIG. 13 apparatus with the upper forming member removed.
Figure 15:
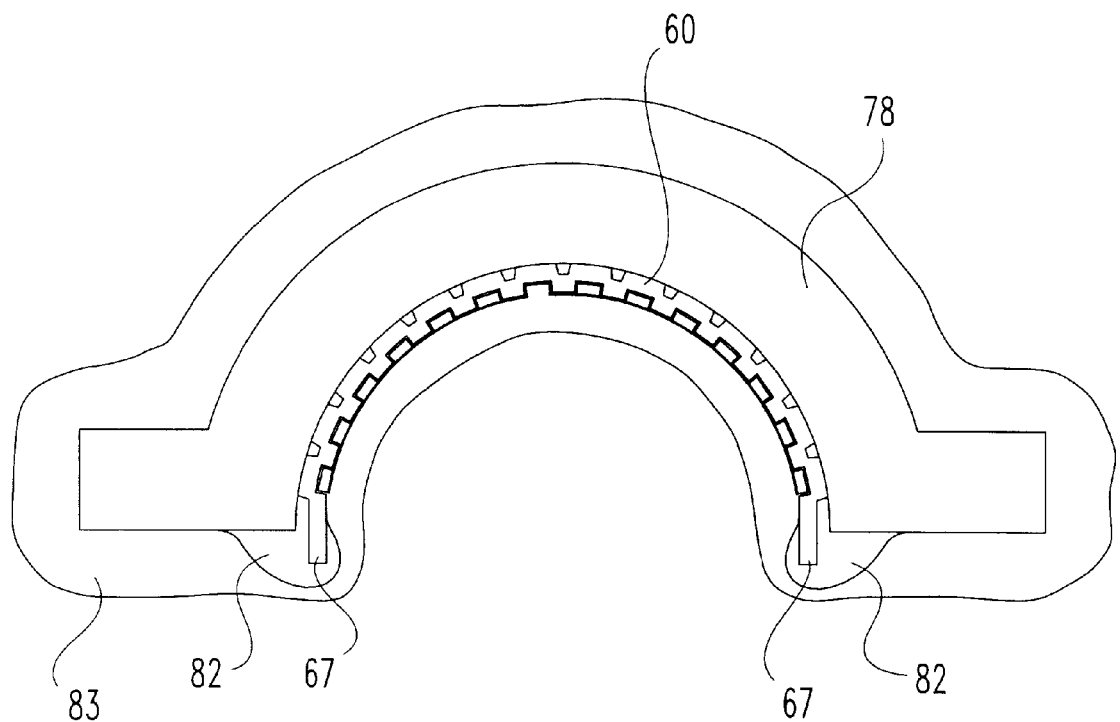
FIG. 15 is an illustrative view of the FIG. 13 apparatus with the lower forming member removed and the pattern of FIG. 11 coated with a flowable mold forming material.

Referring to FIGS. 13–15, there is illustrated a cover member pattern forming apparatus 70. The cover member pattern forming apparatus 70 is a tool utilized to form the cover member pattern 60 into a shape substantially similar to the outer surface of the spar member 23. The pattern forming apparatus 70 forms the cover member pattern 60 and functions to hold the pattern during a shelling process in order to form a mold into which the molten metal will be poured to form the cast cover member 24. In one embodiment, the cover member pattern forming apparatus 70 comprising a first reusable portion 71, a second reusable portion 72, and a third non-reusable portion 78.

The first reusable portion 71 and the third non-reusable portion 78 are aligned by a pair of alignment pins 73 that extend between the portions. The reusable portion 71 and the non-reusable portion 78 form a separable combination that upon positioning together forms the pattern 60 to the desired configuration. Forming of the pattern 60 more particularly includes shaping the outer surface of wall members 65 to match the precise spar member contour. The reusable portion 71 includes a precision forming mandrel 74 for receiving the pattern 60 along it's outer surface 74. At least one pair of locating members 75 are coupled to the mandrel 74 for positioning the pattern 60 in a predetermined position for shaping. The locating members 75 being spaced on the mandrel 74 corresponding to the spanwise orientation of the airfoil. While other quantities of locating members are contemplated herein, it is preferred that there are no more than two locating members 75. The locating members 75 being designed and constructed to nest within one of the recesses 63 formed on the second surface 62 of the pattern 60.

The mandrel 74 having a precision shape corresponding to the contour of the outer surface of the spar member 23. The non-reusable portion 78 having a surface 69 that corresponds to the precise contour of the the external shape of the desired airfoil. In the preferred embodiment the non-reusable portion is formed of standard ceramic mold material and defines a portion of the casting mold after the shelling process for the pattern 60 has been completed. The pattern 60 is located on the locating member 75 and then elastically and/or plastically formed over the mandrel 74. The non-reusable portion 78 is brought into engagement with the first surface 61 of the pattern 60 to effectuate a closed die forming operation. In one embodiment the second reusable portion 72 is positioned around the non-reusable portion 78 to provide added strength during the closed die forming operation. In an alternate embodiment the non-reusable portion 78 has sufficient strength to withstand the closed die forming operation without the second reusable portion 72. The pattern 60 has now been formed to have a first surface that is substantially similar to the desired airfoil shape and an opposite second surface 62 that is substantially similar to the spar member's contour.

In a preferred embodiment the pattern 60 has an adhesive applied to it's first surface 61 prior to the closed die forming, via the cover member pattern forming apparatus 70, in order to bond the pattern 60 to the non-reusable portion 78. More particularly, the adhesive is applied in a thin line on the first surface 61; and the adhesive is a hot glue, such as EVA that sets at the softening temperature of the pattern 60 material. Further, the pattern 60 and adhesive are able to be cleanly burned out of the ceramic mold.

The non-reusable portion 78 with the pattern 60 bonded thereto is removed from the reusable portion(s) 71 and/or 72 of the cover member pattern forming apparatus 70. A gating material 82 is applied along the ends 67 of the pattern 60 to create a seal between the non-reusable portion 78 and the pattern 60. It is believed well known in the art how to gate and seal a pattern. The non-reusable portion 78 and pattern 60 are dipped in a ceramic slurry to form a shell 83 therearound to a thickness desirable for casting a metal component therein. The shelling material system is one that can be removed by leaching and water blasting after the molten material has been solidified. Shelling systems and methods of removing the pattern 60 are believed within the contemplation of a person of ordinary skill in the art.

With reference to FIGS. 3–8 a method for bonding the plurality of airfoil cover members 24 to the airfoil spar member 23 will be discussed. The cover member 24 being bonded is preferably a precision cast component, however the process is also applicable to wrought structures. The spar member 23 and plurality of cover members 24 are positioned within the mechanical housing 31 such that they are fixtured by the spar member locating fixture 43 and removeable top positioning member 33 in a spaced relationship from the sidewalls of the housing. With the spar member 23 and cover members 24 disposed in form fitting engagement and having the compliant interface member 41 positioned thereround, it is now appropriate to begin the joining process.

In one embodiment of the present invention, the bonding tool 27 has the plurality of clamping load transfer assemblies 34 adjusted to bring the load pads 37 thereof into substantially form fitting engagement with the outer surface of the cover members 24. Referring to FIG. 6, there is illustrated a portion of the torquing sequence for the clamping load transfer assemblies 34. The clamping load transfer assemblies 34 are torqued sequentially from number 1001 to 1015. The bonding tool 27 with the spar member 23 and cover members 24 disposed therein is placed in the furnace 28 for elevation to a temperature appropriate for metallurgical bonding. During the metallurgical bonding process the vacuum source 29 is activated to apply an active vacuum within the mechanical housing 31. During the heating process the load transfer members 38 elongate relative to the main body members 36 so as to apply a compressive load through the centroids of the clamping load transfer assembly heads 37 to the cover members 24. The heat and clamping load causes a metallurgical bonding between the cover members 24 and the spar member 23. In the preferred embodiment the bonding process is a diffusion braze bonding operation utilizing a composition of nickel, chromium and boron. Diffusion braze bonding is well known to one of ordinary skill in the art. Upon completion of the bonding cycle the compliant interface is removed from the cover member 24.

With reference to FIGS. 9–10, there is illustrated an alternative method for bonding the plurality of cover members 24 to the spar member 23. The clamshell housing 45 of bonding tool 44 is positioned around the spar member 23 such that it engages the spar member 23 at the tip 47 and hub 48, thereby putting the spar member in a fixed position during the bonding process. The bonding tool 44 with the spar member 23 and plurality of cover members 24 is placed within furnace 28 and elevated to a temperature sufficient for the diffusion braze bonding to occur between the plurality of cover members 24 and the spar member 23. A plurality of deformable pressurizable bladders 46 are disposed within the clamshell housing 45 adjacent the outer surface of the plurality of cover members 24 for applying the bonding load thereto. At the temperature appropriate for metallurgical bonding the bladders become compliant and upon pressurization deform from the locating feature 601, preferably located at the leading edge 18, to the trailing edge 19 of the spar member. Each of the deformable bladders 46 collapses against the outer surface of the plurality of cover members 24 from it's respective leading edge end 51 to it's respective trailing edge end 52.

With reference to FIGS. 13–15, a brief overview of the utilization of the cover member forming apparatus 70 will be set forth. The cover member pattern 60 is formed over the mandrel 74. At least one of the recesses 63 within the pattern 60 is positioned relative to the locating member 75 to align the pattern within the apparatus 70. The non-reusable portion 78 is brought into engagement with the pattern 60 to shape the first surface 61 and the second surface 62 thereof. An adhesive had been applied to pattern 60 so as to bond the pattern to surface 69 of the ceramic non-reuseable forming portion 78. The upper non-reusable portion 78 with the pattern 60 bonded thereto is removed from the reusable portion 71 and the ends 67 of the pattern 60 are gated. Thereafter, the non-reusable portion 78 with the pattern 60 bonded thereto is processed by dipping in a ceramic slurry so as to shell the pattern 60 and the non-reuseable portion 78. Upon obtaining the appropriate thickness in the shelling operation the pattern 60 and adhesive is burned out of the ceramic shell in preparation for the pouring of molten metal therein. After the molten metal has solidified in the mold cavity the ceramic shell is removed by leaching and pressurized fluid blasting. Any oxidation present on the component is removed by light grit blasting and etching.

Figure 16:
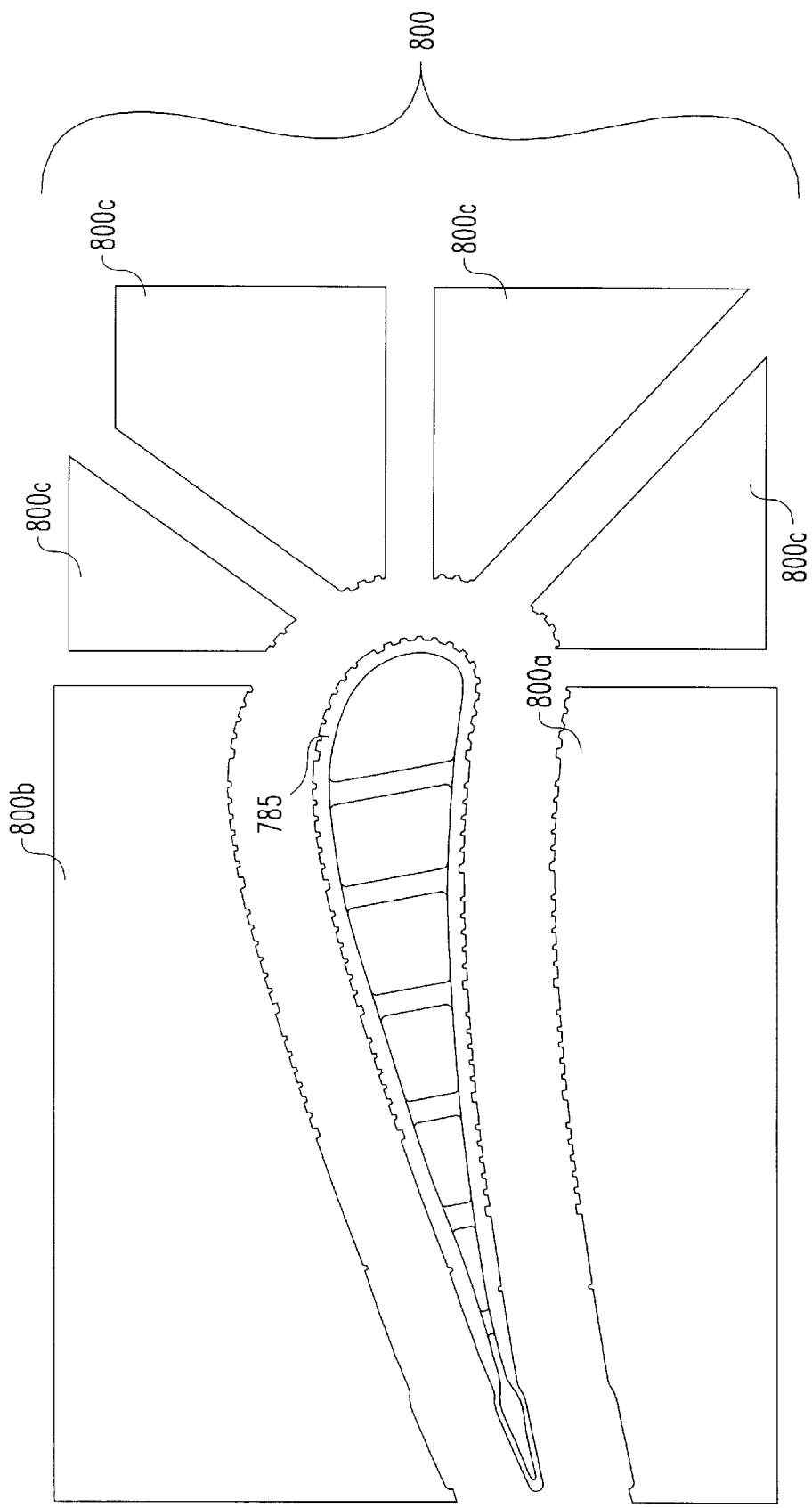
FIG. 16 is an illustrative view of a wax die for forming a cast spar.
Figure 17A:
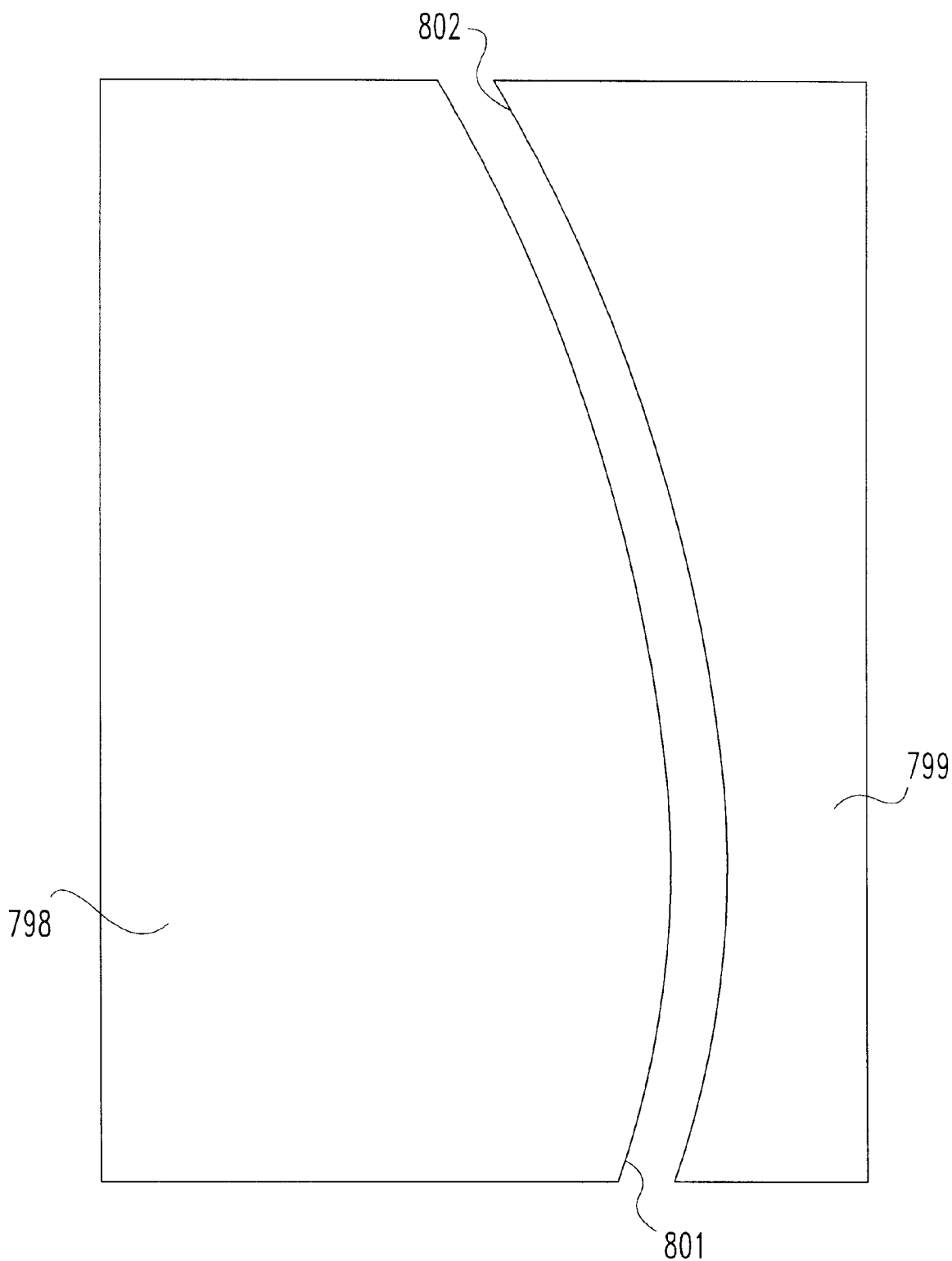
FIGS. 17a–d illustrate steps involved in producing the FIG. 16 wax die.
Figure 17B:
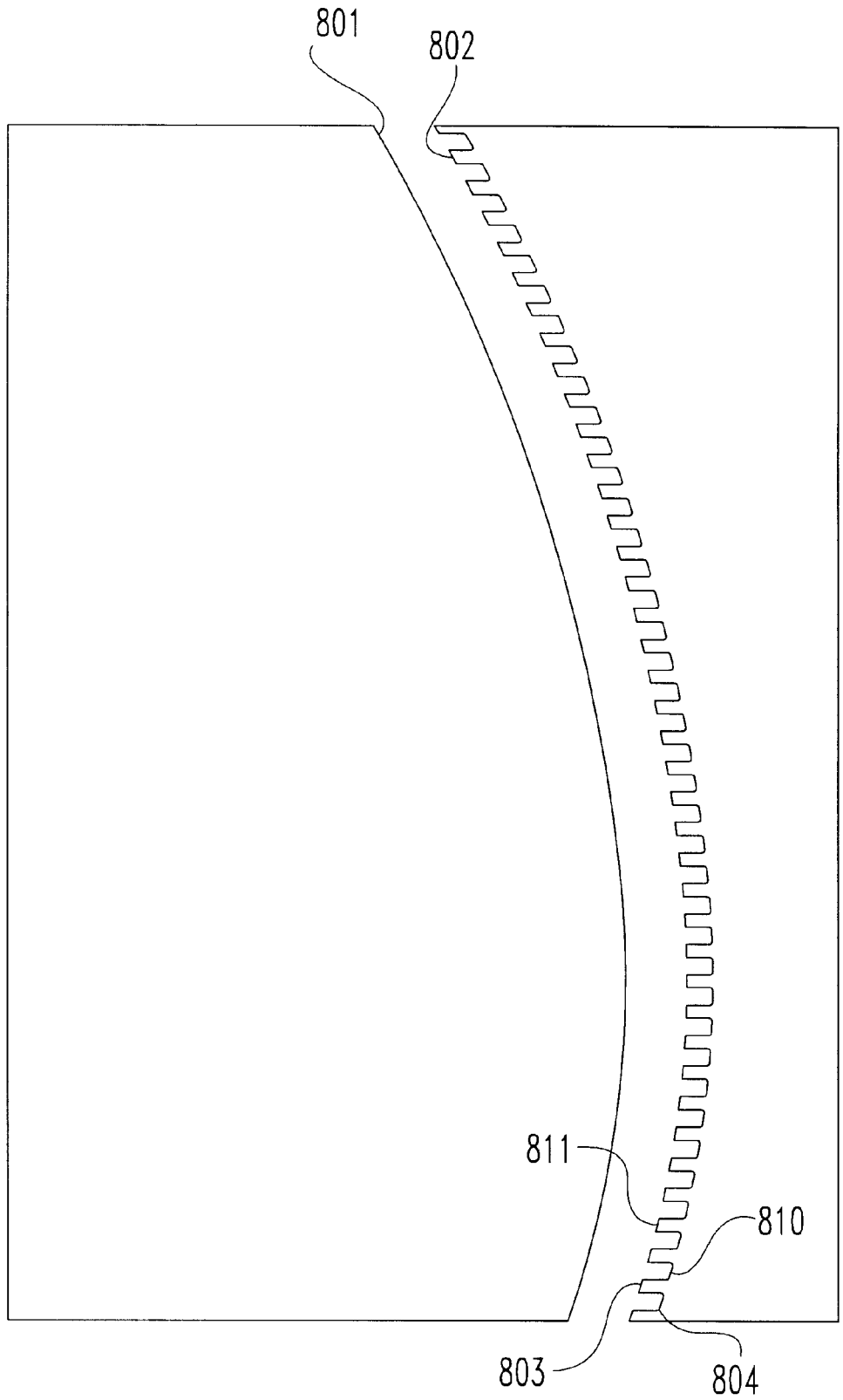
Figure 17C:
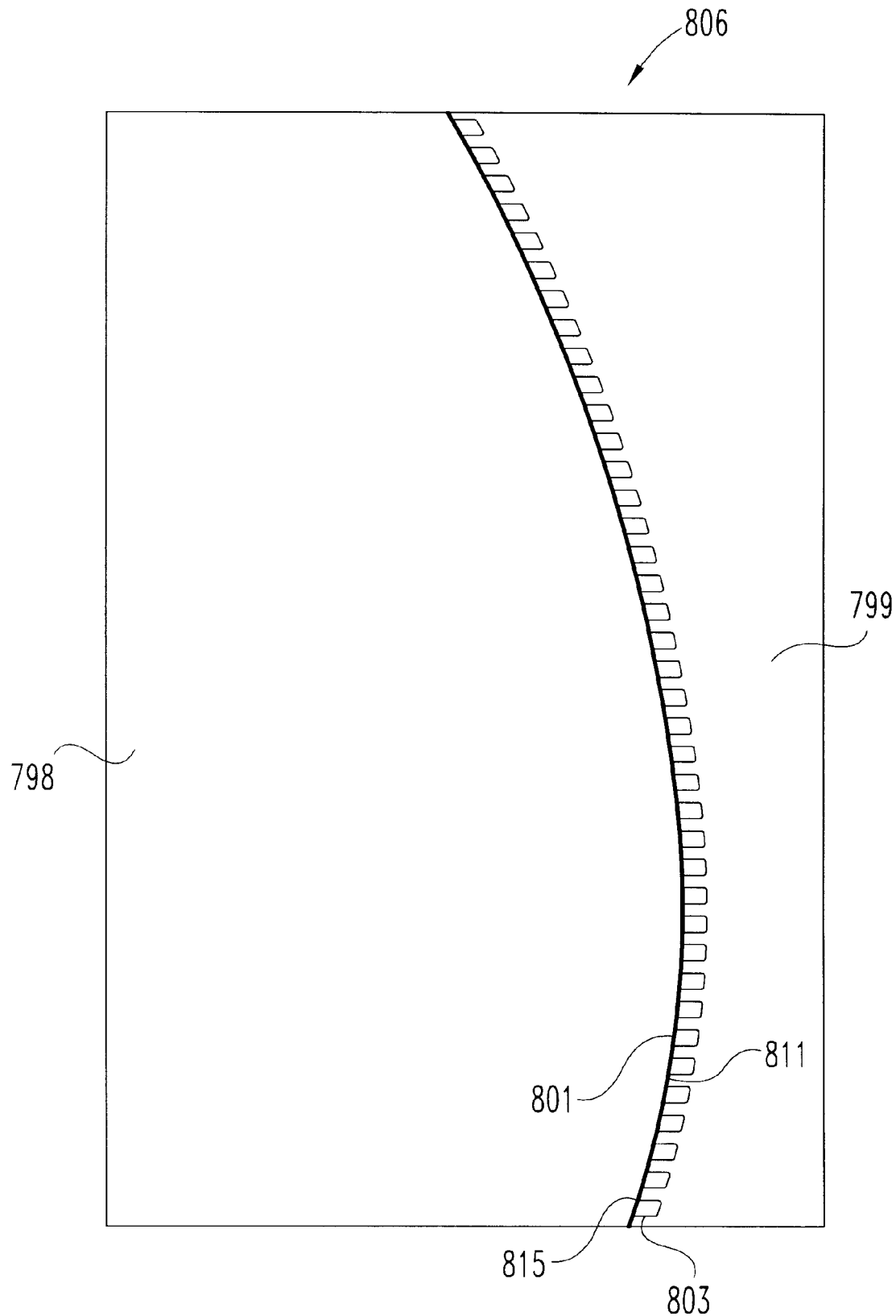
Figure 17D:
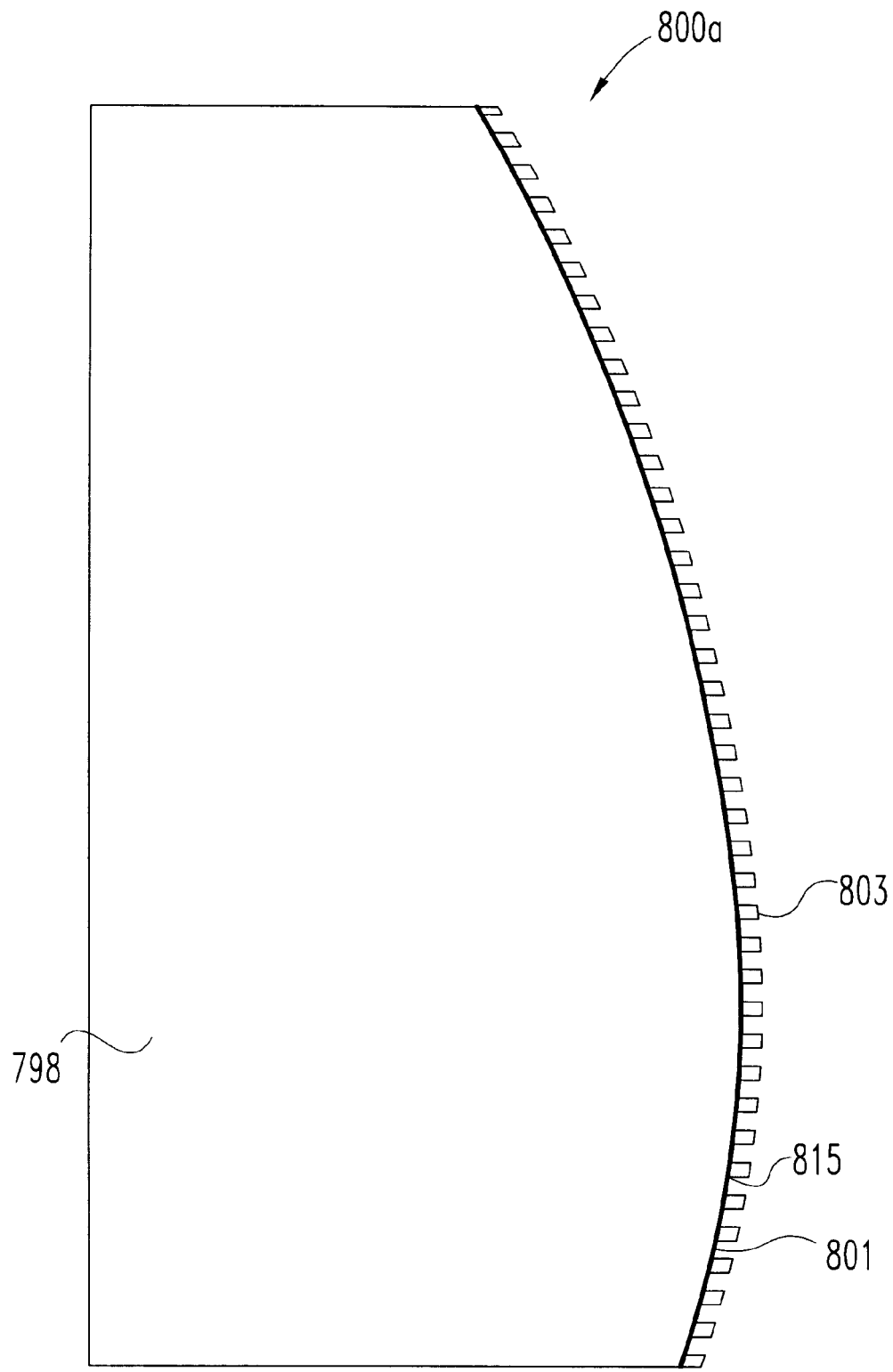

With reference to FIG. 16, there is illustrated an apparatus 800 for forming a pedestal configuration in a spar pattern 785. The preferred form of the apparatus 800 is defined by a reusable metal wax die 800 having substantially sharp corners. The wax die 800 is then utilized to produce a spar pattern 785 having sharp corners, which result in a cast spar with sharp corners which are desirable for the effective bonding of a cover member thereto. The wax die 800 includes, but is not intended to be limited herein to, a pressure side die portion 800a, a suction side die portion 800b, and a plurality of leading edge die portions 800c. The die portions 800a–800c interengaging to form the spar pattern 785. It is understood that other quantites of die portions are contemplated herein.

With the assistance of FIGS. 17a–d, there will be described the apparatus 800 and the method of manufacture. The method for fabricating apparatus 800 is set forth in relation to the fabrication of the pressure side die portion 800a, however, the fabrication of the other portions is substantially identical and will not be repeated herein. A piece of metal is divided into two separate pieces 798 and 799 having two precisely mating surface 801 and 802 respectively. A pedestal pattern 803 is machined into one of the precisely mating surfaces. In the preferred embodiment the pedestal pattern 803 is formed via electrical discharge machining (EDM), however other manufacturing techniques are contemplated herein. The machining forms a pattern having a first end 810 with filets 804, and an opposite other end 811 free of filets in surface 803. Thereafter the two precisely mating surfaces 801 and 802 are joined together. In the preferred embodiment the bond is a metallurgical bond created in a diffusion bonding process. However, other techniques for joining the pieces 798 and 799 together are contemplated herein provided they have a mating sharp corner. One alternate technique for joining the pieces together is to use a high temperature high strength epoxy. The bonded pieces 798 and 799 define a member 806 having a pattern 803 therein. The joining of the opposite other end 811 to the mating surface 801 results in a substantially sharp corner. In a preferred embodiment the corner 815 where the opposite other end 811 abuts the mating surface 801 is defined by the intersecting plane and surface.

A portion of the member 806 is removed including the first end 810 with filets 804 to expose the pattern 803. The pattern 803 is then machined to provide the desired depth. The resulting wax die 800 has a pattern 803 formed therein with sharp corners 815 adjacent the mating surface 801. The wax die 800 is formed such that an entire spar member pattern can be produced from the die.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for bonding a cover member to a spar member of an airfoil for a gas turbine engine, comprising:

a mechanical housing enclosing the cover member and the spar member during bonding, the spar member fixedly positioned relative to said mechanical housing; and a plurality of clamping members along substantially the entire outer surface of the cover member for holding the cover member and the spar member in substantially form fitting engagement during the metallurgical bonding, said plurality of clamping members sequentially adjusted to apply a non-uniform clamping load to the outer surface, whereby upon heating metallurgical bonding can occur between the spar member and the cover member.

2. An apparatus for bonding a cover member to a spar member of an airfoil for a gas turbine engine, comprising:

a mechanical housing enclosing the cover member and the spar member during metallurgical bonding;

a plurality of clamping members coupled to said mechanical housing positioned along the outer surface of the cover member for holding the cover member and the spar member adjacent one another during the metallurgical bonding, at least one of said clamping members being elongatable upon heating so as to press at least a portion of the cover member against the spar member, whereby metallurgical bonding can occur between the spar member and the cover member.

3. A method for fabricating a gas turbine engine airfoil by metallurgically bonding a cover member to a spar member that is performed within a mechanical housing having a plurality of clamping members coupled thereto, comprising:

placing the spar member and cover member within the mechanical housing so that they are disposed in substantially form fitting alignment;

engaging the outer surface of the cover member with the plurality of clamping members;

applying a non-uniform clamping load through the plurality of clamping members to the outer surface of the cover member; and heating the spar and cover member so that metallurgical bonding can occur therebetween.

4. An apparatus for bonding a gas turbine engine airfoil cover member to a gas turbine engine airfoil spar member, comprising:

a mechanical housing enclosing the cover member and the spar member during metallurgical bonding; and a plurality of deformable pressurizable bladders disposed within said mechanical housing for holding the cover member in substantially form fitting engagement with the spar member during the metallurgical bonding, at least one of said plurality of deformable pressurizable bladders being sequentially deformable between a first end and an opposite second end to sequence the transmission of an initial bonding load over the cover member, whereby upon heating metallurgical bonding can occur between the spar member and the cover member.

5. The apparatus of claim 1, which further comprises a lower positioning member within said mechanical housing, and wherein said lower positioning member associated with the spar member being fixedly positioned relative to said mechanical housing.

6. The apparatus of claim 5, wherein said mechanical housing further comprises a top positioning member, and wherein said top positioning member and said bottom positioning member fixedly position the spar member relative to said mechanical housing.

7. The apparatus of claim 6, wherein said top positioning member and said bottom positioning member transfer unbalanced loading on the spar member to said mechanical housing.

8. The apparatus of claim 6, wherein said top positioning member and said bottom positioning member are each defined by a cross key structure.

9. The apparatus of claim 6, wherein at least one of said positioning members is removable from said mechanical housing.

10. The apparatus of claim 1, wherein each of said plurality of clamping members has a radius of curvature corresponding to the curvature of an outer surface of the cover member that is positioned proximate thereto.

11. The apparatus of claim 1, wherein each of said plurality of clamping members, comprises:

a main body member having an aperture, said main body member fixedly coupled to said mechanical housing; and a load transfer member slidingly disposed within said aperture, said load transfer member having a first end and a second end.

12. The apparatus of claim 11, further comprising a plurality of clamping load pads proximate the cover member, each of said plurality of clamping load pads coupled to said first end of a corresponding one of said load transfer members, said load transfer member acting upon said clamping load pad to provide a compressive force to the cover member.

13. The apparatus of claim 12, wherein each of said plurality of clamping members further comprises an adjustment mechanism associated with said main body member for adjusting a preload to be transferred through said load transfer member to the cover member.

14. The apparatus of claim 13, wherein each of said adjustment mechanisms are independently adjustable.

15. The apparatus of claim 12, wherein said plurality of clamping load pads apply the clamping load substantially normal to the outer surface of the cover member.

16. The apparatus of claim 15, wherein each of said clamping load pads has a centroid, and wherein the clamping load is applied through said centroids.

17. The apparatus of claim 12, further comprising at least one interface member disposed between the cover member and said plurality of clamping load pads.

18. The apparatus of claim 17, wherein said at least one interface member is formed of a compliant material.

19. The apparatus of claim 18, wherein said compliant material is defined by a ceramic felt.

20. The apparatus of claim 18, wherein said compliant material is defined by a mild steel-woven screen.

21. The apparatus of claim 1, wherein said mechanical housing, the spar member, and the cover member all have substantially equal coefficients of expansion.

22. The apparatus of claim 1, wherein each of said plurality of clamping members includes:
- a main body member having a first end and a second end with a central aperture therethrough, said first end is connected to said mechanical housing;
- a load transfer member slidingly disposed within said central aperture, said load transfer member having a third end and fourth end;
- an adjuster coupled to said second end of said main body member and contactable with one of said ends of the load transfer member; and
- a clamping load pad coupled to the other of said ends of the load transfer member, said clamping load pad having a radius of curvature corresponding to the outer surface of the cover member against which it transfers the clamping load.

23. The apparatus of claim 22, wherein said adjuster has a threaded portion that engages said second end of the main body member and a non-threaded portion that engages said other of said ends of the load transfer member and further includes a head that is moveable to advance the adjuster.

24. The apparatus of claim 23, which further includes a compliant interface positioned between said plurality of clamping load pads and the cover member.

25. The apparatus of claim 12, which further includes a member for coupling together said plurality of clamping load pads.

26. The apparatus of claim 1, which further includes a vacuum furnace, and wherein the apparatus is located within said vacuum furnace.

27. The apparatus of claim 2, wherein said at least one of said clamping members, comprises:
- a main body member having an aperture therein, said main body member coupled to said mechanical housing;
- a load transfer member slidable within said aperture; and
- a clamping load pad coupled with said load transfer member and adapted for transmitting a compressive force to the cover member.

28. The apparatus of claim 27, wherein said load transfer member has a thermal coefficient of expansion that is greater than the thermal coefficient of expansion of said main body member, whereby upon heating said load transfer member elongates to act upon said clamping load pad to press the cover member against the spar member.

29. The apparatus of claim 28, wherein said load transfer member elongates in the range of about 0.005 inches to about 0.015 inches.

30. The apparatus of claim 28, which further comprises a top and bottom positioning member for fixedly positioning the spar member within said mechanical housing.

31. The apparatus of claim 30, wherein said clamping load pad has a radius of curvature corresponding to an outer surface of the cover member.

32. The apparatus of claim 31, wherein said at least one of said clamping members further comprises an adjuster for setting a preload to be transferred through said load transfer member to the cover member.

33. The apparatus of claim 28, wherein said main body member is made of a directionally solidified superalloy.

34. The apparatus of claim 2, wherein said at least one of said clamping members defines a plurality of clamping members, and wherein each of said clamping members comprises:
- a main body member having an aperture therein, said main body member coupled to said mechanical housing;
- a load transfer member slidable within said aperture; and
- a clamping load pad coupled with said load transfer member and adapted for applying a compressive force to the cover member.

35. The apparatus of claim 34, wherein each of said load transfer members has a thermal coefficient of expansion greater than the thermal coefficient of expansion of each of said main body members, whereby upon heating said load transfer members elongate to act upon said clamping load pads to press the cover member against the spar member.

36. The apparatus of claim 35, wherein each of said load transfer members define a directionally solidified member, and wherein each of said main bodies is formed of a material selected from silicon nitride or TZM Moly.

37. The apparatus of claim 35, which further comprises a top and bottom positioning member for fixedly positioning the spar member within said mechanical housing and wherein said positioning members are adapted to transfer unbalanced loading from the spar member to said mechanical housing.

38. The method of claim 3, wherein said applying comprises sequentially tightening the clamping members.

39. The method of claim 38, wherein said applying comprises elongating at least a portion of the plurality of clamping members so as to transmit the clamping load to the outer surface of the cover member.

40. The method of claim 39, wherein said elongating is in response to said heating.

41. The method of claim 40, wherein said heating defines heating to a temperature in the range of about 2100 degrees Fahrenheit to about 2220 degrees Fahrenheit.

42. The method of claim 40, wherein said heating defines heating to a temperature of about 2150 degrees Fahrenheit.

43. The method of claim 40, wherein said placing further comprises fixturing the spar within the mechanical housing so as to minimize movement therebetween.

44. The method of claim 43, which further includes transferring unbalanced loading applied to the spar to the mechanical housing.

45. The method of claim 3, which further comprises lowering the pressure and actively evacuating the environment within the mechanical housing during the metallurgical bonding.

46. The method of claim 3, wherein said placing of the spar member and cover member further comprises positioning a compliant interface member around the cover member and further comprising removing the compliant interface member after the bonding.

47. The method of claim 41:
- wherein said heating is for about one hour to about five hours;
- wherein said placing further comprises fixturing the spar within the mechanical housing so as to minimize movement therebetween;
- which further comprises transferring any unbalanced loads applied to the spar member to the mechanical housing; and
- which further comprises lowering the pressure and actively evacuating the environment within the mechanical housing during the metallurgical bonding.

48. The method of claim 3, wherein said placing further comprises fixturing the spar within the mechanical housing so as to minimize movement therebetween, and wherein the plurality of clamping members are deformed from a first end to a second end.

49. The method of claim 48, which further includes pressurizing the plurality of clamping members.

50. The method of claim 49, wherein said heating defines heating to a temperature in the range of about 2100 degrees Fahrenheit to about 2220 degrees Fahrenheit, and which further comprises lowering the pressure and actively evacuating the environment within the mechanical housing during the metallurgical bonding.

51. The apparatus of claim 4, wherein said plurality of deformable pressurizable bladders are pressurized in order from a leading edge of the spar member to a trailing edge of the spar member.

52. The apparatus of claim 4, wherein said housing is a reusable clamshell type housing.

53. The apparatus of claim 4, wherein the spar member is fixedly coupled to the mechanical housing during the metallurgical bonding.

54. The apparatus of claim 53, wherein the mechanical housing is adapted to engage a tip end and a hub end of the spar member.

55. The apparatus of claim 54, which further includes a source of pressurized gas, and wherein said source of pressurized gas is coupled with said plurality of deformable bladders.

56. The apparatus of claim 55, wherein said source of pressurized gas provides a gas having a pressure in the range of about 50 to 500 pounds per square inch gage.

57. The apparatus of claim 4, wherein said plurality of bladders are formed of a metallic material.

58. The apparatus of claim 57, wherein said plurality of bladders are made of a material selected from the group of IN625, HASTALY X, or HA230.

59. The apparatus of claim 4, wherein each of said plurality of bladders have a leading edge end and an opposite trailing edge end, and each of said plurality of bladders individually and sequentially deforming from said leading edge end to said trailing edge end to transmit a bond load to the cover member.

* * * * *